US009611587B2

(12) United States Patent
Gantenbein et al.

(10) Patent No.: US 9,611,587 B2
(45) Date of Patent: Apr. 4, 2017

(54) PROCESS FOR PREPARING SELF-BINDING PIGMENT PARTICLES

(71) Applicant: Omya International AG, Oftringen (CH)

(72) Inventors: Daniel Gantenbein, Elnesvagen (NO); Patrick A. C. Gane, Rothrist (CH); Joachim Schoelkopf, Killwangen (CH); Maximilian Laufmann, Zofingen (CH); Lars Andersson, Kilchberg (CH)

(73) Assignee: Omya International AG, Oftringen (CH)

( * ) Notice: Subject to any disclaimer, the term of this patent is extended or adjusted under 35 U.S.C. 154(b) by 0 days.

(21) Appl. No.: 14/394,632

(22) PCT Filed: Apr. 29, 2013

(86) PCT No.: PCT/EP2013/058937
§ 371 (c)(1),
(2) Date: Oct. 15, 2014

(87) PCT Pub. No.: WO2013/167420
PCT Pub. Date: Nov. 14, 2013

(65) Prior Publication Data
US 2015/0083026 A1    Mar. 26, 2015

Related U.S. Application Data

(60) Provisional application No. 61/648,639, filed on May 18, 2012.

(30) Foreign Application Priority Data

May 11, 2012    (EP) ..................... 12167683

(51) Int. Cl.
| | | |
|---|---|---|
| *C09C 1/02* | (2006.01) | |
| *C09C 3/08* | (2006.01) | |
| *C09C 3/00* | (2006.01) | |
| *D21H 17/26* | (2006.01) | |
| *D21H 17/24* | (2006.01) | |
| *D21H 17/27* | (2006.01) | |
| *D21H 17/28* | (2006.01) | |
| *D21H 17/32* | (2006.01) | |
| *D21H 17/67* | (2006.01) | |
| *D21H 17/69* | (2006.01) | |
| *D21H 19/38* | (2006.01) | |
| *D21H 17/00* | (2006.01) | |
| *C08L 1/28* | (2006.01) | |
| *C08L 3/02* | (2006.01) | |
| *C08L 39/00* | (2006.01) | |
| *D21H 17/29* | (2006.01) | |
| *D21H 17/45* | (2006.01) | |
| *D21H 21/28* | (2006.01) | |

(52) U.S. Cl.
CPC .............. *D21H 17/26* (2013.01); *C08L 1/286* (2013.01); *C08L 3/02* (2013.01); *C08L 39/00* (2013.01); *C09C 1/021* (2013.01); *D21H 17/00* (2013.01); *D21H 17/24* (2013.01); *D21H 17/27* (2013.01); *D21H 17/28* (2013.01); *D21H 17/29* (2013.01); *D21H 17/32* (2013.01); *D21H 17/455* (2013.01); *D21H 17/67* (2013.01); *D21H 17/675* (2013.01); *D21H 17/69* (2013.01); *D21H 19/385* (2013.01); *D21H 21/28* (2013.01); *C01P 2004/62* (2013.01); *C01P 2006/12* (2013.01); *C01P 2006/22* (2013.01)

(58) Field of Classification Search
CPC .. C09C 1/02; C09C 1/021; C09C 3/08; C09C 3/00
See application file for complete search history.

(56) References Cited

U.S. PATENT DOCUMENTS

| | | | |
|---|---|---|---|
| 3,822,827 A * | 7/1974 | Clark ..................... | B28C 1/006 241/3 |
| 3,873,336 A | 3/1975 | Lambert et al. | |
| 5,181,662 A * | 1/1993 | Bousquet ............. | C01F 11/185 106/465 |
| 5,384,013 A | 1/1995 | Husband et al. | |
| 5,411,639 A | 5/1995 | Kurrle | |
| 5,514,212 A | 5/1996 | Kurrle | |
| 2003/0072721 A1 * | 4/2003 | Riley ....................... | A61K 8/19 424/49 |
| 2007/0266898 A1 | 11/2007 | Gane et al. | |
| 2008/0210394 A1 | 9/2008 | Mahr et al. | |
| 2009/0020250 A1 | 1/2009 | Kimura et al. | |
| 2009/0114120 A1 * | 5/2009 | McIntyre ............ | C09B 67/0096 106/31.65 |
| 2010/0120948 A1 | 5/2010 | Gane et al. | |

FOREIGN PATENT DOCUMENTS

| | | | |
|---|---|---|---|
| WO | 9108341 A1 | 6/1991 | |
| WO | 9532335 A1 | 11/1995 | |

(Continued)

OTHER PUBLICATIONS

International Search Report dated Sep. 3, 2013 for PCT Application No. PCT/EP2013/058937.
Written Opinion of International Searching Authority dated Sep. 3, 2013 for PCT Application No. PCT/EP2013/058937.
Communication dated Feb. 14, 2013 for European Application No. 12167683.7.

(Continued)

*Primary Examiner* — Pegah Parvini
(74) *Attorney, Agent, or Firm* — Amster, Rothstein & Ebenstein LLP

(57) ABSTRACT

The present invention concerns a process for preparing self-binding pigment particles from an aqueous suspension of a calcium carbonate containing material, wherein an anionic binder and at least one cationic polymer are mixed with the suspension.

57 Claims, 11 Drawing Sheets

(56) References Cited

FOREIGN PATENT DOCUMENTS

| | | | |
|---|---|---|---|
| WO | 2006008657 A2 | 1/2006 | |
| WO | WO 2006/008657 * | 1/2006 | ............... C09C 3/08 |
| WO | 2006128814 A1 | 12/2006 | |
| WO | 2008139292 A1 | 11/2008 | |
| WO | 2009010483 A2 | 1/2009 | |
| WO | 2012055739 A1 | 5/2012 | |

OTHER PUBLICATIONS

Grant Decision for RU 2014150056.
Office Action dated Nov. 7, 2014 for AU Application No. 2013258240.
Office Action dated Jul. 19, 2015 for TW Application No. 102114742.
Office Action dated Mar. 7, 2016 for CA Application No. 2,870,656.
Office Action dated Jun. 25, 2015 for CN Application No. 201380024752.5.
Office Action dated Nov. 24, 2015 for JP Application No. 2015-510729.
Office Action dated Jun. 28, 2016 for CA Application No. 14-239332.
Office Action dated Oct. 27, 2016 for Application No. 10-2014-7033202.
Office Action dated Oct. 29, 2015 for MX Application No. MX/a/2014/013210.
Communication dated Aug. 16, 2016 for EP 16172585.8.
International Preliminary Report on Patentability dated Nov. 20, 2014 for PCT/EP2013/058937.

* cited by examiner

PROCESS FOR PREPARING SELF-BINDING PIGMENT PARTICLES

CROSS-REFERENCE TO RELATED APPLICATIONS

This application is a U.S. national phase of PCT Application No. PCT/EP2013/058937, filed Apr. 29, 2013, which claims priority to European Application No. 12167683.7, filed May 11, 2012 and U.S. Provisional Application No. 61/648,639, filed May 18, 2012.

The invention relates to a process for preparing self-binding pigment particle suspensions, to a self-binding pigment particle suspension as well as to a paper product comprising self-binding pigment particles and to the use of the self-binding pigment particle suspension.

Mineral materials and binders are among the main constituents used in the manufacture of numerous products such as paints, paper and plastic materials. Therein, mineral materials such as calcium carbonate and other particulate materials contribute mechanical and optical properties, while the binder, generally latex-based and in the form of aqueous suspensions or dispersions, provide the necessary adhesion and cohesion for the respective constituents of the end product to be produced.

In order to avoid the logistic difficulties of handling mineral materials and binders separately, and further to avoid the unwanted physical and chemical interactions developed in comparable mixtures of mineral materials and binders, self-binding pigment particles have been developed and are known to industry. In this regard, self-binding pigment particles having both the properties of the mineral material and the binder may be directly implemented in a variety of applications. This unique product named self-binding pigment particles refers to distinct, solid particles, formed of mineral material and binder that are intimately bound to one another. The internal cohesion forces are such as to provide the self-binding pigment particles with excellent mechanical stability.

Self-binding pigment particles are prepared by a process implementing at least one step of grinding mineral materials in the presence of binder, where grinding refers to an operation leading to a reduction in the particle size; the mineral materials in the self-binding pigment particles have a smaller diameter than the initial mineral material used to produce them. Such self-binding pigment particles are described in a number of documents, including WO 2006/008657, WO 2006/128814, and WO 2008/139292.

For completeness, the Applicant would like to mention the following applications in its name, which also refer to processes for preparing self-binding pigment particles: unpublished European Patent Applications with filing numbers 11 160900.4, 11 160926.9, 11 179604.1, and 11 179572.0.

Self-binding pigment particles containing binders that are based on polymers which are derived from natural or renewable resources are a particular point of interest for environmental reasons. However, such self-binding pigment particles are often formed from negatively charged modified polysaccharides, which may be unfavorable for some fields of applications. For example, due to their negative surface charge such pigment particles are difficult to retain during paper production processes. This leads to a high consumption of self-binding pigment particles and additional retention aid during paper production to obtain the desired filler load in the paper.

A further problem in paper production processes is that filler levels in paper are limited due to paper strength losses as filler levels increase. One reason for this is that the reduced number of fibers in the paper sheet reduces the number of fiber bonds in the sheet and the presence of the filler reduces the area of contact between the remaining fibers. As a result, retaining high amounts of filler produces a weaker sheet that can break more easily on the paper machines, size presses, coaters, winders, printing presses, printing machines, or copy machines.

However, high filler levels in paper are desirable since these would provide the possibility to reduce the amount of wood fibers in the paper. Moreover, papers with a high filler content will dry faster, and as a result, the paper machine can run faster. Consequently, the addition of high levels of filler can reduce paper production costs and saves natural resources.

U.S. Pat. No. 5,611,890 relates to a strong, soft filled tissue paper comprising a non-cellulosic particulate filler, wherein said filler comprises 5 to 50 wt.-% of said tissue paper. WO 03/087472 discloses a filler treatment comprising the preparation of swollen starch-latex compositions, and the addition of said compositions to a filler suspension. The use of these treated fillers during papermaking improves filler retention and produces filled papers, where addition of the filler has only a minimal negative effect on strength properties. A papermaking filler material which has been surface treated with a cationic polymer is described in CA 2,037,525. The article "Improvement of paper properties using starch-modified precipitated calcium carbonate filler" of Zhao et al., TAPPI Journal 2005, vol. 4(2), is concerned with commercial precipitated calcium carbonate fillers that have been modified with corn and potato raw starches. These modified fillers were used as papermaking fillers to improve the strength in high filler content papers.

In view of the foregoing, improving the self-binding pigment particle production process remains of interest to the skilled man.

Accordingly, it is an object of the present invention to provide a process for making self-binding pigment particles, which avoids the forgoing disadvantages. In particular, it is desirable, to provide a process for making self-binding pigment particles, which allow for the provision of a filler material that shows a good retention in paper production processes, and avoids the use of large amounts of retention aids. It is also desirable that the obtained self-binding pigment particles can be incorporated into paper in large quantities, and thus, allow the production of high filler content paper, without deteriorating the mechanical or optical properties of the paper. It would also be desirable to provide a process for making obtained self-binding pigment particles which have the ability of improving the mechanical properties of paper when used as filler material in paper applications, especially when used in the production of high filler content papers.

The foregoing and other objectives are solved by the subject-matter as defined herein in the independent claims.

According to one aspect of the present invention, a process for preparing self-binding pigment particles is provided, the process comprising the following steps:

a) providing a suspension comprising at least one calcium carbonate containing material,
b) providing an anionic polymeric binder, wherein said binder comprises at least one modified polysaccharide,
c) providing at least one cationic polymer,
d) mixing the suspension of step a) and the binder of step b), and e) grinding the mixed suspension of step d),
wherein the at least one cationic polymer of step c)
- (i) is mixed in step d) with the suspension of step a) and the binder of step b), and/or
- (ii) is mixed with the suspension obtained after grinding step e), and the obtained mixture is deagglomerated.

According to another aspect the present invention provides a self-binding pigment particle suspension, obtainable by the process of the present invention.

According to still another aspect the present invention provides the use of the inventive self-binding pigment particle suspension in paper, plastics, paint, coatings, concrete and/or agriculture applications.

According to still another aspect the present invention provides a paper product comprising self-binding pigment particles, wherein the pigment particles comprise calcium carbonate containing material particles which are at least partially coated with an anionic polymeric binder comprising at least one modified polysaccharide, and at least one cationic polymer.

Advantageous embodiments of the present invention are defined in the corresponding sub-claims.

According to one embodiment, in step d) of the inventive process, the suspension of step a) is, in a first step, mixed with the binder of step b), and then, in a second step, is mixed with the at least one cationic polymer of step c). According to another embodiment, in the first step the suspension of step a) is mixed with a first part the binder of step b), the obtained mixture is ground and then mixed with the remaining part of the binder of step b). According to still another embodiment, in step d) of the inventive process, the binder of step b) is, in a first step, mixed with the cationic polymer of step c), and then, in a second step, is mixed with the suspension of step a). According to still another embodiment, in step d) the suspension of step a) is mixed with the binder of step b) and the cationic polymer of step c) in one step.

According to one embodiment the cationic polymer is added in an amount such that the charge density of the obtained self-binding pigment particles is lower compared to self-binding pigment particles not containing the cationic polymer, preferably the cationic polymer is added in an amount such that the charge density of the obtained self-binding pigment particle is between −100 and −5 µEq/g, preferably between −80 and −10 µEq/g, and more preferably between −70 and −15 µEq/g.

According to one embodiment the at least one calcium carbonate containing material is selected from calcium carbonate, calcium carbonate containing minerals, mixed calcium carbonate based fillers, or mixtures thereof, preferably the at least one calcium carbonate containing material is calcium carbonate, and more preferably ground calcium carbonate. According to another embodiment the at least one calcium carbonate containing material is provided in form of particles having a weight median particle diameter $d_{50}$ value from 0.1 to 100 µm, preferably from 0.1 to 80 µm, more preferably from 0.5 to 50 µm, and most preferably from 5.0 to 25 µm. According to still another embodiment the at least one calcium carbonate containing material is provided in form of particles have a specific surface area of from 0.1 to 200 $m^2/g$, preferably from 1 to 25 $m^2/g$, more preferably from 2 to 15 $m^2/g$, and most preferably from 3 to 12 $m^2/g$.

According to one embodiment the suspension of step a) has a solid content of at least 1 wt.-%, preferably from 1 to 90 wt.-%, more preferably from 5 to 85 wt.-%, even more preferably from 20 to 75 wt.-%, and most preferably from 45 to 65 wt.-%, based on the total weight of the suspension.

According to one embodiment the at least one modified polysaccharide is a carboxymethyl derivate and/or carboxymethyl hydroxypropyl derivate and/or carboxymethyl hydroxyethyl derivate of a polysaccharide, preferably a carboxymethylcellulose, an anionic starch, an anionic guar, or mixtures thereof. According to another embodiment the at least one modified polysaccharide has a degree of substitution of the hydroxyl groups in the range from 0.4 to 2.0, 0.5 to 1.8, 0.6 to 1.6, or 0.7 to 1.5.

According to one embodiment the binder of step b) is a carboxymethylcellulose, preferably having an intrinsic viscosity in the range from 5 to 500 ml/g, preferably from 10 to 400 ml/g, and more preferably from 20 to 350 ml/g. According to another embodiment the binder of step b) is in form of a solution or dry material, preferably in form of a solution having a binder concentration from 1 to 70 wt.-%, preferably from 2 to 30 wt.-%, more preferably from 3 to 15 wt.-%, and most preferably from 4 to 10 wt.-%, based on the total weight of the solution. According to still another embodiment the binder of step b) is added in an amount from 0.001 to 20 wt.-%, preferably from 0.005 to 15 wt.-%, more preferably from 0.01 to 10 wt.-%, and most preferably from 0.05 to 5 wt.-%, based on the total weight of the dry calcium carbonate containing material.

According to one embodiment the at least one cationic polymer of step c) is selected from the group comprising polyamines, polyethyleneimines, polyacrylamides, cationic epichlorohydrin resins, polydiallyldimethylammonium chloride, cationic starch, cationic guar, and mixtures thereof. According to another embodiment the at least one cationic polymer of step c) is in form of a solution or dry material, preferably in form of an aqueous solution having a concentration from 1 to 70 wt.-%, preferably from 2 to 55 wt.-%, more preferably from 5 to 50 wt.-%, and most preferably from 30 to 50 wt.-%, based on the total weight of the solution. According to still another embodiment the at least one cationic polymer of step c) is added in an amount from 0.001 to 20 wt.-%, preferably from 0.005 to 15 wt.-%, more preferably from 0.01 to 10 wt.-%, and most preferably from 0.05 to 5 wt.-% or from 0.5 to 2.5 wt.-%, based on the total weight of the dry calcium carbonate containing material.

According to one embodiment the grinding step e) is carried out at a temperature from 5 to 110° C., from 10 to 100° C., from 15 to 80° C., or from 20° C. to 25° C. According to another embodiment the grinding step e) is carried out in batch or continuously, preferably continuously. According to still another embodiment the process further comprises a step of concentrating the obtained suspension of self-binding pigment particles. The concentration step can be carried out by using thermal and/or mechanical methods well known to the skilled person.

According to one embodiment the self-binding pigment particle suspension is used in wet end processes of a paper machine, in cigarette paper, board and/or coating applications, or as a support for rotogravure and/or offset and/or ink jet printing and/or continuous ink jet printing and/or flexography and/or electrography and/or decoration surfaces. According to another embodiment the self-binding pigment particle suspension is used to reduce sun light and UV exposure of plant leaves.

According to one embodiment the paper product has a higher bending stiffness compared to a paper product, wherein the self-binding pigment particles are replaced by the same amount of the calcium carbonate containing material particles, preferably the bending stiffness is at least 5% higher, preferably at least 7% higher, and more preferably at least 10% higher compared to the bending stiffness of a paper product, wherein the self-binding pigment particles are replaced by the same amount of the calcium carbonate containing material particles.

It should be understood that for the purpose of the present invention, the following terms have the following meaning.

The term "anionic polymeric binder" as used in the present invention is a polymer that is capable of binding to the surface of the calcium carbonate containing material particles and to itself and/or to certain other materials upon drying. The binding includes ionic interactions and/or hydrogen-hydrogen-bridge bonds between the groups on the surface of the calcium carbonate containing material particles and the functional groups of the polymer. Furthermore, the term "anionic polymer" or "anionic polymeric binder" in the meaning of the present invention refers to a polymer having a negative net charge. Said compound is typically modified with anionic groups. The term "anionic" does not exclude the presence of cationic groups provided that the sum of individual charges is negative.

A "calcium carbonate containing material" in the meaning of the present invention can be a mineral material or a synthetic material having a content of calcium carbonate of at least 50 wt.-%, preferably 75 wt.-%, more preferably 90 wt.-%, and most preferably 95 wt.-%, based on the total weight of the calcium carbonate containing material. The term "dry calcium carbonate containing material" is understood to refer to calcium carbonate containing material particles having a total surface moisture content of less than 0.5 wt.-%, preferably less than 0.2 wt.-% and more preferably less than 0.1 wt.-%, based on the total weight of the particles.

The term "cationic polymer" in the meaning of the present invention refers to a polymer having a positive net charge. Said compound is typically modified with cationic groups. The term "cationic" does not exclude the presence of anionic groups provided that the sum of individual charges is positive.

Throughout the present document, the "degree of substitution" is specified in respect to the total amount of substituted or modified groups per unmodified monomer unit of the original polysaccharide.

The term "free polymer" in the meaning of the present invention refers to the amount of polymer in the suspension, which is not bound to the calcium carbonate containing material particles.

"Ground calcium carbonate" (GCC) in the meaning of the present invention is a calcium carbonate obtained from natural sources, such as limestone, marble, calcite or chalk, and processed through a wet and/or dry treatment such as grinding, screening and/or fractionation, for example by a cyclone or classifier. The term "dry ground calcium carbonate" is understood to refer to a ground calcium carbonate having a total surface moisture content of less than 0.5 wt.-%.

The term "intrinsic viscosity" as used in the context of the present invention is a measure of the capability of a polymer in solution to enhance the viscosity of the solution and is specified in ml/g.

"Modified calcium carbonate" (MCC) in the meaning of the present invention may feature a natural ground or precipitated calcium carbonate with an internal structure modification or a surface-reaction product.

"Modified polysaccharides" in the meaning of the present invention are polysaccharides, wherein at least a part of the hydroxyl groups is carboxylated. Additionally, the modified polysaccharides may contain other modifications such as aldehyde groups.

Throughout the present document, the "particle size" of a calcium carbonate product is described by its distribution of particle sizes. The value $d_x$ represents the diameter relative to which x % by weight of the particles have diameters less than $d_x$. This means that the $d_{20}$ value is the particle size at which 20 wt.-% of all particles are smaller, and the $d_{75}$ value is the particle size at which 75 wt.-% of all particles are smaller. The $d_{50}$ value is thus the weight median particle size, i.e. 50 wt.-% of all grains are bigger or smaller than this particle size. For the purpose of the present invention the particle size is specified as weight median particle size $d_{50}$ unless indicated otherwise. For determining the weight median particle size $d_{50}$ value for particles having a $d_{50}$ value between 0.2 and 5 μm, a Sedigraph 5100 or 5120 device from the company Micromeritics, USA, can be used.

"Precipitated calcium carbonate" (PCC) in the meaning of the present invention is a synthesized material, generally obtained by precipitation following a reaction of carbon dioxide and calcium hydroxide (hydrated lime) in an aqueous environment or by precipitation of a calcium and a carbonate source in water. Additionally, precipitated calcium carbonate can also be the product of introducing calcium and carbonate salts, calcium chloride and sodium carbonate for example, in an aqueous environment.

A "specific surface area (SSA)" of a mineral pigment in the meaning of the present invention is defined as the surface area of the mineral pigment divided by the mass of the mineral pigment. As used herein, the specific surface area is measured by adsorption using the BET isotherm (ISO 9277: 2010) and is specified in $m^2/g$.

A "suspension" or "slurry" in the meaning of the present invention comprises insoluble solids and water, and optionally further additives and usually contains large amounts of solids and, thus, is more viscous and can be of higher density than the liquid from which it is formed.

For the purposes of the present invention, the term "viscosity" with reference to coating formulations, refers to Brookfield viscosity. The Brookfield viscosity may be measured by a Brookfield viscometer at 23° C. at 100 rpm and is specified in mPa·s.

Where the term "comprising" is used in the present description and claims, it does not exclude other elements. For the purposes of the present invention, the term "consisting of" is considered to be a preferred embodiment of the term "comprising of". If hereinafter a group is defined to comprise at least a certain number of embodiments, this is also to be understood to disclose a group, which preferably consists only of these embodiments.

Where an indefinite or definite article is used when referring to a singular noun, e.g. "a", "an" or "the", this includes a plural of that noun unless something else is specifically stated.

Terms like "obtainable" or "definable" and "obtained" or "defined" are used interchangeably. This e.g. means that, unless the context clearly dictates otherwise, the term "obtained" does not mean to indicate that e.g. an embodiment must be obtained by e.g. the sequence of steps following the term "obtained" even though such a limited understanding is always included by the terms "obtained" or "defined" as a preferred embodiment.

The inventive process for preparing self-binding pigment particles comprises the steps of (a) providing a suspension comprising at least one calcium carbonate containing material, (b) providing an anionic polymeric binder, wherein said binder comprises at least one modified polysaccharide, (c) providing at least one cationic polymer, (d) mixing the suspension of step (a) and the binder of step (b), and (e)

grinding the mixed suspension of step (d), wherein the at least one cationic polymer of step c) (i) is mixed in step d) with the suspension of step a) and the binder of step b), and/or (ii) is mixed with the suspension obtained after grinding step e), and the obtained mixture is deagglomerated.

In the following the details and preferred embodiments of the inventive process will be set out in more detail. It is to be understood that these technical details and embodiments also apply to the inventive self-binding pigment particle suspension and their use.

Step a): The Suspension of at Least One Calcium Carbonate Containing Material

In step a) of the process of the present invention an aqueous suspension of at least one calcium carbonate containing material is provided. The aqueous suspension of the calcium carbonate containing material can be obtained by mixing particles of calcium carbonate containing material with water.

The calcium carbonate containing material can be selected from calcium carbonate, calcium carbonate containing minerals, mixed carbonate based fillers, or mixtures thereof. Calcium carbonate may be selected from ground calcium carbonate, precipitated calcium carbonate, modified calcium carbonate or mixtures thereof.

According to a preferred embodiment of the present invention, the calcium carbonate containing material is ground calcium carbonate.

Ground (or natural) calcium carbonate (GCC) is understood to be a naturally occurring form of calcium carbonate, mined from sedimentary rocks such as limestone or chalk, or from metamorphic marble rocks. Calcium carbonate is known to exist as three types of crystal polymorphs: calcite, aragonite and vaterite. Calcite, the most common crystal polymorph, is considered to be the most stable crystal form of calcium carbonate. Less common is aragonite, which has a discrete or clustered needle orthorhombic crystal structure. Vaterite is the rarest calcium carbonate polymorph and is generally unstable. Ground calcium carbonate is almost exclusively of the calcitic polymorph, which is said to be trigonal-rhombohedral and represents the most stable of the calcium carbonate polymorphs. The term "source" of the calcium carbonate in the meaning of the present application refers to the naturally occurring mineral material from which the calcium carbonate is obtained. The source of the calcium carbonate may comprise further naturally occurring components such as magnesium carbonate, alumino silicate etc.

According to one embodiment of the present invention the GCC is obtained by dry grinding. According to another embodiment of the present invention the GCC is obtained by wet grinding and subsequent drying.

In general, the grinding step can be carried out with any conventional grinding device, for example, under conditions such that the comminution predominantly results from impacts with a secondary body, i.e. in one or more of: a ball mill, a rod mill, a vibrating mill, a roll crusher, a centrifugal impact mill, a vertical bead mill, an attrition mill, a pin mill, a hammer mill, a pulveriser, a shredder, a de-clumper, a knife cutter, or other such equipment known to the skilled man. In case calcium carbonate containing mineral powder comprises a wet ground calcium carbonate containing mineral material, the grinding step may be performed under conditions such that autogenous grinding takes place and/or by horizontal ball milling, and/or other such processes known to the skilled man. The wet processed ground calcium carbonate containing mineral material thus obtained may be washed and dewatered by well known processes, e.g. by flocculation, filtration or forced evaporation prior to drying. The subsequent step of drying may be carried out in a single step such as spray drying, or in at least two steps. It is also common that such a mineral material undergoes a beneficiation step (such as a flotation, bleaching or magnetic separation step) to remove impurities.

According to one embodiment of the present invention the source of ground calcium carbonate (GCC) is selected from marble, chalk, calcite, dolomite, limestone, or mixtures thereof. Preferably, the source of ground calcium carbonate is selected from marble.

According to one embodiment, the suspension of process step a) comprises one ground calcium carbonate. According to another embodiment of the present invention, the suspension of process step a) comprises a mixture of two or more ground calcium carbonates selected from different sources of ground calcium carbonate. For example, the suspension of at least one ground calcium carbonate may comprise one GCC selected from dolomite and one GCC selected from marble.

According to one embodiment of the present invention, the suspension of process step a) consists of at least one ground calcium carbonate. The suspension of process step a) may consists of one ground calcium carbonate, or may consists of two or more ground calcium carbonates selected from different sources of ground calcium carbonate.

"Precipitated calcium carbonate" (PCC) in the meaning of the present invention is a synthesized material, generally obtained by precipitation following reaction of carbon dioxide and lime in an aqueous environment or by precipitation of a calcium and carbonate ion source in water or by precipitation of calcium and carbonate ions, for example from $CaCl_2$ and $Na_2CO_3$, out of solution. Precipitated calcium carbonate exists in three primary crystalline forms: calcite, aragonite and vaterite, and there are many different polymorphs (crystal habits) for each of these crystalline forms. Calcite has a trigonal structure with typical crystal habits such as scalenohedral (S-PCC), rhombohedral (R-PCC), hexagonal prismatic, pinacoidal, colloidal (C-PCC), cubic, and prismatic (P-PCC). Aragonite is an orthorhombic structure with typical crystal habits of twinned hexagonal prismatic crystals, as well as a diverse assortment of thin elongated prismatic, curved bladed, steep pyramidal, chisel shaped crystals, branching tree, and coral or worm-like form.

According to one embodiment, the precipitated calcium carbonate is ground before it used in the process of the present invention.

According to one embodiment, the suspension of process step a) comprises one precipitated calcium carbonate, preferably scalenohedral precipitated calcium carbonate (S-PCC). According to another embodiment of the present invention, the suspension of process step a) comprises a mixture of two or more precipitated calcium carbonates selected from different sources of precipitated calcium carbonate. For example, the suspension of at least one precipitated calcium carbonate may comprise one PCC selected from S-PCC and one PCC selected from R-PCC. According to another embodiment of the present invention, the suspension of process step a) consists of at least one precipitated calcium carbonate. The suspension of step a) may consist of one type of PCC, or may consist of a mixture of two or more types of PCC.

A modified calcium carbonate may feature a natural ground or precipitated calcium carbonate with a surface and/or internal structure modification, e.g., the calcium carbonate may be treated or coated with a hydrophobising surface treatment agent such as, e.g. an aliphatic carboxylic acid or a siloxane. According to a preferred embodiment of the present invention, the modified calcium carbonate is a surface-reacted calcium carbonate.

According to one embodiment of the present invention, the calcium carbonate containing material comprises one modified calcium carbonate. According to another embodiment of the present invention, the calcium carbonate containing material comprises a mixture of two or more modified calcium carbonates having different surface and/or internal structure modifications. According to one embodiment of the present invention, the calcium carbonate containing material consists of one modified calcium carbonate. According to another embodiment of the present invention, the calcium carbonate containing material consists of a mixture of two or more modified calcium carbonates having different surface and/or internal structure modifications.

According to another embodiment the calcium carbonate containing material is a mixture of ground calcium carbonate and/or precipitated calcium carbonate and/or modified calcium carbonate.

According to one embodiment of the present invention, the calcium-carbonate containing minerals comprise dolomite.

According to a preferred embodiment, the mixed carbonate based fillers are selected from calcium associated with magnesium and analogues or derivatives, various matter such as clay or talc or analogues or derivatives, and mixtures of these fillers, such as, for example, talc-calcium carbonate or calcium carbonate-kaolin mixtures, or mixtures of natural calcium carbonate with aluminium hydroxide, mica or with synthetic or natural fibers or co-structures of minerals such as talc-calcium carbonate or talc-titanium dioxide or calcium carbonate-titanium dioxide co-structures.

According to another embodiment of the present invention the aqueous suspension comprising the at least one calcium carbonate containing material comprises a further mineral such as talc, kaolin, $TiO_2$, bentonite, or mixtures thereof.

According to one embodiment the at least one calcium carbonate containing material is provided in form of particles. The calcium carbonate containing material particles can have a weight median particle diameter $d_{50}$ value from 0.1 to 100 μm, preferably from 0.1 to 80 μm, more preferably from 0.5 to 50 μm, and most preferably from 5.0 to 25 μm.

According to one embodiment of the present invention, the calcium carbonate containing material particles have a specific surface area of from 0.1 to 200 $m^2/g$, preferably from 1 to 25 $m^2/g$, more preferably from 2 to 15 $m^2/g$, and most preferably from 3 to 12 $m^2/g$, measured using nitrogen and the BET method according to ISO 9277:2010.

The at least one calcium carbonate containing material is suspended in water, and thus, forms an aqueous suspension or slurry of the calcium carbonate containing material. The obtained suspension can be ground under conditions such that autogenous grinding takes place and/or by horizontal ball milling, and/or other such processes known to the skilled man.

According to one embodiment of the present invention, the suspension provided in process step a) has a solid content of at least 1 wt.-%, preferably from 1 to 90 wt.-%, more preferably from 5 to 85 wt.-%, even more preferably from 20 to 75 wt.-%, and most preferably from 45 to 65 wt.-%, based on the total weight of the suspension. The suspension of process step a) can be provided undispersed or dispersed, i.e. the suspension includes a dispersant. According to a preferred embodiment, the suspension of step a) is undispersed, i.e. it does not contain a dispersant.

According to an exemplary embodiment, the at least one calcium carbonate containing material is provided in form of a moist filter cake, preferably having a solid content from 65 to 85 wt.-%, based on the total weight of the suspension.

Step b): The Anionic Polymeric Binder

In step b) of the process according to the present invention an anionic polymeric binder is provided, wherein said binder comprises at least one modified polysaccharide.

"Modified polysaccharides" in the meaning of the present invention are polysaccharides, wherein at least a part of the hydroxyl groups is carboxylated. Additionally, the modified polysaccharides may contain other modifications such as aldehyde groups.

Modified polysaccharides according to the present invention may comprise the following structure:

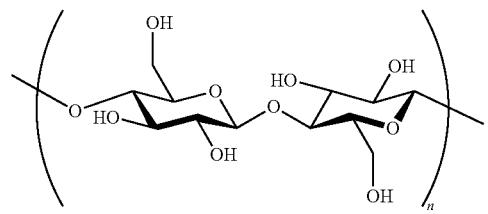

wherein a part of the hydroxyl groups is carboxylated and "n" is indirectly represented by the intrinsic viscosity.

Polysaccharides are polymeric carbohydrate structures, formed of repeating units (at least 10) joined together by glycosidic bonds. Depending on the spatial arrangement of the glycosidic bonds, one may distinguish between α- and β-glycosidic bonds. These structures may be linear, but may also contain various degrees of branching. Polysaccharides may also contain slight modifications of the repeating unit. Exemplary polysaccharides are starch, cellulose, or glycogen, but also structural polysaccharides such as cellulose and chitin.

The modified polysaccharide may have a degree of substitution of the hydroxyl groups in the range from 0.4 to 2.0, 0.5 to 1.8, 0.6 to 1.6, or 0.7 to 1.5.

According to one embodiment of the present invention, the at least one modified polysaccharide is a carboxymethyl derivate and/or carboxymethyl hydroxypropyl derivate and/or carboxymethyl hydroxyethyl derivate of a polysaccharide. For example, the modified polysaccharide can be a carboxymethylcellulose (CMC), an anionic starch, an anionic guar, or mixtures thereof.

According to a preferred embodiment of the present invention, the at least one modified polysaccharide is carboxymethylcellulose (CMC).

Carboxymethylcellulose (CMC) may be prepared from cellulose by reaction with monochloroacetic acid in the presence of caustic soda to form the sodium salt of carboxymethylcellulose. Each repeating D-glycose unit contains three hydroxyl groups capable of etherification, to give a maximum charge density of three carboxylic groups per monomer unit (i.e., a degree of substitution of three). The molecular weight and the intrinsic viscosity of the carboxymethylcellulose-based binder materials can be adjusted by the treatment with hydrogen peroxide ($H_2O_2$). Reference is made to DE 1 543 116 A1 describing a method for the preparation of low viscous, water-soluble CMC by oxidative degradation with $H_2O_2$ (hydrogen peroxide) and to DE 44 11

681 A1 describing the dependency of the degradation of polysaccharide ether on the amount of oxidizing agent, temperature and duration of the treatment.

According to one embodiment of the present invention, the carboxymethylcellulose has an intrinsic viscosity in the range from 5 to 500 ml/g, preferably from 10 to 400 ml/g, and more preferably from 20 to 350 ml/g.

According to another preferred embodiment of the present invention, the at least one modified polysaccharide is an anionic starch.

The anionic starch is preferably chemically modified with anionic groups selected from the group comprising carboxyl groups, carboxymethyl groups, carboxymethyl hydroxypropyl groups, carboxymethyl hydroxyethyl groups, phosphate groups, sulfonate groups and mixtures thereof. The anionic starch can be chosen from amongst the chemically modified starches originating from starches selected from the group comprising wheat starch, corn starch, rice starch, potato starch, tapioca starch, maranta starch, sorghum starch and mixtures thereof. In one preferred embodiment, the anionic starch is selected from those enriched in amylopectin, that is to say the chemically modified starch is preferably selected from the group consisting of rice starch, potato starch, and mixtures thereof. The anionic starch can also be obtained from genetically modified sources comprising amylopectin enriched starches. Methods for preparing such anionic starches are known by the skilled person. The molecular weight of the anionic starch can range from 1000 to 1000000 g/mol and is generally about 220000 g/mol. The molecular weight of the anionic starch can be adjusted by the treatment with hydrogen peroxide ($H_2O_2$).

According to another preferred embodiment of the present invention, the at least one modified polysaccharide is an anionic guar.

Guar comprises a natural heteropolysaccharide (guaran) consisting of galactose units and mannose units usually in the ratio of 1:2 and is the endosperm component of guar seeds. In general, guar comprises a linear chain of 1,4-linked β-D-mannopyranosyl units with 1,6-linked α-D-galactopyranosyl units. Guar seeds containing about 14 to 17 wt.-% husk, 35 to 42 wt.-% endosperm and 43 to 47 wt.-% embryo, are usually dry-milled and screened to separate out the endosperm which is the industrial guar of commerce. A guar derivative can be obtained, for example, by modifying the heteropolysaccharide through the use of enzymes, acids, oxidation media, temperature, radiation etc. Methods for preparing such guar derivatives are known to the skilled person. For example, a modification may be obtained by the use of a commercially available α-D-galactosidase enzyme which is useful to remove α-D-galactopyranosyl units. By controlling the length of time that the guaran is exposed to the α-D-galactosidase enzyme, the extent of removal of α-D-galactopyranosyl units from the linear chain of mannose units can be controlled. Additionally or alternatively, a modification of guar may be obtained by etherification of guar with propyleneoxide or ethyleneoxide resulting in a hydroxypropyl guar or hydroxyethyl guar.

According to one embodiment of the present invention, the anionic guar is a carboxymethyl guar (CMG) and/or carboxymethyl hydroxypropyl guar (CMHPG) and/or carboxymethyl hydroxyethyl guar (CMHEG). For example, carboxymethyl guar is obtained by reacting a guar with monochloroacetic acid in the presence of caustic soda.

A solution of modified polysaccharide can be concentrated, for example, by ultrafiltration or thermal drying. Dry modified polysaccharide is preferably produced by thermal drying, more preferably by spray drying and has a solids content of more than 90, preferably from 95 to 99.9 wt.-%, based on the total weight of the modified polysaccharide.

According to one embodiment of the present invention, the anionic polymeric binder of process step b) comprises one modified polysaccharide. According to another embodiment of the present invention, the anionic binder of process step b) comprises two or more modified polysaccharides. According to a preferred embodiment of the present invention, the anionic polymeric binder of process step b) consists of at least one modified polysaccharide. The anionic polymeric binder of process step b) may consist of one type of modified polysaccharide, or may consist of a mixture of two or more types of modified polysaccharides.

According to one embodiment of the present invention, the anionic polymeric binder employed in the process according to the present invention has a pH from 4.5 to 12, preferably from 7 to 11, and more preferably from 8.0 to 10.5.

The anionic polymeric binder can be provided as solution or dry material. According to a preferred embodiment, the anionic polymeric binder is in form of an aqueous solution.

According to one embodiment of the present invention, the anionic polymeric binder is in form of an aqueous solution having a binder concentration from 1 to 70 wt.-%, preferably from 2 to 30 wt.-%, more preferably from 3 to 15 wt.-%, and most preferably from 4 to 10 wt.-%, based on the total weight of the binder solution.

According to one embodiment of the present invention the binder of step b) is added in an amount from 0.001 to 20 wt.-%, preferably from 0.005 to 15 wt.-%, more preferably from 0.01 to 10 wt.-%, and most preferably from 0.05 to 5 wt.-%, based on the total weight of the dry calcium carbonate containing material.

According to a preferred embodiment of the present invention, the anionic binder of step b) is at least one carboxymethylcellulose added in an amount from 0.05 to 5 wt.-%, preferably from 0.5 to 2.5 wt.-%, based on the total weight of the dry calcium carbonate containing material.

Step c)

In step c) of the process according to the present invention at least one cationic polymer is provided.

The inventors of the present application surprisingly found that the addition of at least one cationic polymer can lead to a better retention of the self-binding pigment particles during paper production processes. Without being bound to any theory, it is believed that the anionic charge of the anionic polymer binder is at least partially neutralized by the cationic polymer.

The inventors also found that the addition of at least one cationic polymer can reduce the amount of free polymer in the obtained self-binding pigment particles suspension. Without being bound to any theory, it is believed that the cationic polymer can improve the adhesion or adsorption of the anionic binder and/or the at least one cationic polymer on the ground calcium carbonate particles. This finding was very surprising since it is known that the dispersion of ground calcium carbonate with cationic starch can result in pigment particle suspension containing high amounts of free polymer.

Furthermore, the inventors surprisingly found that the self-binding properties of the pigment particles are also improved. As a result, paper products comprising the inventive self-binding particles as filler material exhibit an improved strength, and also allow the production of papers with high content of filler material. Another advantage is that the physical and optical properties of paper comprising the inventive self-binding pigment particles as filler material are not impaired to any substantial degree.

According to one embodiment of the present invention, the at least one cationic polymer is selected from the group comprising polyamines, polyethyleneimines, polyacrylamides, cationic epichlorohydrin resins, polydiallyldimethylammonium chloride, cationic starch, cationic guar, or mixtures thereof.

According to another embodiment of the present invention, the at least one cationic polymer is a polyamine, preferably a polyethyleneimine (PEI) being selected from the group comprising branched polyethyleneimines, linear polyethyleneimines and mixtures of the foregoing. Preferably, the ratio of primary, secondary and tertiary amine functions in the inventive branched polyethyleneimines is in the range of 1:0.86:0.42 to 1:1.20:0.76, prior to a possible modification of the branched polyethyleneimines.

According to one preferred embodiment of the present invention, the at least one polyethyleneimine is selected from the group of modified and unmodified polyethyleneimines. Examples for suitable polyethyleneimines are homopolymers of ethylenimine (aziridine) or its higher homologues and also the graft polymers of polyamidoamines or polyvinylamines with ethyleneimine or its higher homologues. The polyethyleneimines can be crosslinked or uncrosslinked, quaternized and/or modified by reaction with alkylene oxides, dialkyl or alkylene carbonates or $C_1$-$C_8$-carboxylic acids. The polyethyleneimines may be modified by reaction with alkylene oxides such as ethylene oxide, propylene oxide or butylene oxide, dialkyl carbonates such as dimethyl carbonate and diethyl carbonate, alkylene carbonates such as ethylene carbonate or propylene carbonate, or $C_1$-$C_8$-carboxylic acids. Modified PEIs can include alkoxylated polyethyleneimines such as propoxylated polyethyleneimines (PPEIs) and ethoxylated polyethyleneimines (EPEIs). Further preferred modified polyethyleneimines can be obtained by reacting the unmodified PEIs with one or more $C_1$-$C_{28}$-fatty acids, preferably with one or more $C_6$-$C_{18}$-fatty acids and especially preferred with $C_{10}$-$C_{14}$-fatty acids, like, e.g., coconut fatty acid.

The polyethyleneimine can have a weight average molecular weight $M_w$ in the range of 1000 g/mol and 1000000 g/mol. In another preferred embodiment of the present invention the polyethyleneimine is selected from the group of linear polyethyleneimines having a weight average molecular weight $M_w$ from 100 to 700 g/mol, and preferably from 146 to 232 g/mol, and preferably is selected from triethylenetetramine, pentaethylenehexamine and tetraethylenepentamine. According to another preferred embodiment the polyethyleneimine is selected from the group of branched polyethyleneimines having a weight average molecular weight $M_w$ from 500 to 8000 g/mol and preferably from 800 to 1200 g/mol.

According to one embodiment of the present invention, the at least one cationic polymer is a cationic starch.

The cationic starch is preferably chemically modified with cationic groups selected from the group comprising amino groups, immonium groups, ammonium groups, sulfonium groups, phosphonium groups, and mixtures thereof. The cationic starch can be chosen from amongst the chemically modified starches originating from virtual any natural sources providing for starch in reasonable amounts. For example the cationic starch can be chosen from amongst the chemically modified starches originating from starches selected from the group comprising wheat starch, corn starch, rice starch, potato starch, tapioca starch, maranta starch, sorghum starch and mixtures thereof. In one preferred embodiment, the cationic starch is selected from those enriched in amylopectin, that is to say the chemically modified starch is preferably selected from the group consisting of rice starch, potato starch, and mixtures thereof. The cationic starch can also be obtained from genetically modified sources comprising amylopectin enriched starches. Methods for preparing such cationic starches are known by the skilled person. The molecular weight of the cationic starch can range from 1000 to 1000000 g/mol and is generally about 220000 g/mol. The molecular weight of the cationic starch can be adjusted by the treatment with hydrogen peroxide ($H_2O_2$).

According to another embodiment of the present invention, the at least one cationic polymer is a cationic guar.

Guar comprises a natural heteropolysaccharide (guaran) consisting of galactose units and mannose units usually in the ratio of 1:2 and is the endosperm component of guar seeds. In general, guar comprises a linear chain of 1,4-linked β-D-mannopyranosyl units with 1,6-linked α-D-galactopyranosyl units. Guar seeds containing about 14 to 17 wt.-% husk, 35 to 42 wt.-% endosperm and 43 to 47 wt.-% embryo, are usually dry-milled and screened to separate out the endosperm which is the industrial guar of commerce. A guar derivative can be obtained, for example, by modifying the heteropolysaccharide through the use of enzymes, acids, oxidation media, temperature, radiation etc. Methods for preparing such guar derivatives are known to the skilled person. For example, a modification may be obtained by the use of a commercially available α-D-galactosidase enzyme which is useful to remove α-D-galactopyranosyl units. By controlling the length of time that the guaran is exposed to the α-D-galactosidase enzyme, the extent of removal of α-D-galactopyranosyl units from the linear chain of mannose units can be controlled. A cationic guar can be obtained by reacting guar with derivatives of quaternary ammonium salts.

According to still another embodiment of the present invention, the at least one cationic polymer is polydiallyldimethylammonium chloride (polyDADMAC).

PolyDADMAC (polydiallyldimethylammonium chloride) is a linear homopolymer of diallyldimethylammonium chloride (DADMAC) having the following structure:

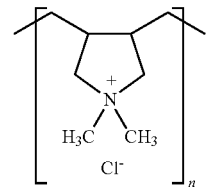

The linear homopolymer formed from a monomer that has a quaternary ammonium and two unsaturated —CH=$CH_2$ functionalities is polymerized by free-radical polymerization of the DADMAC. In the polyDADMAC structure quaternary ammonium groups are on rings that are included in the backbone of the polymer chain. This composition means that the polyDADMAC macromolecules tend to be quite stiff, having a longer persistence length than, for instance, polyamines. For this reason, polyDADMAC is expected to have a more extended conformation in solution. The polyDADMAC can have a weight average molecular weight $M_w$ in the range from 10000 to 1000000 g/mol and preferably in the range from 100000 to 500000 g/mol.

Further examples of cationic polymer that are suitable for the process of the present invention are polyacrylamides, or cationic epichlorohydrin resins.

According to an exemplary embodiment, the polyacrylamides include monomers of dialkylaminoethyl(meth)acrylates, dialkylaminoethyl(meth)acrylamides, dialkylaminomethyl(meth)acrylamides, and dialkylamino-1,3-propyl (meth)acrylamides, preferably copolymerized with nonionic monomers, preferably arylamide.

According to another embodiment, the cationic epichlorohydrin resins are copolymers comprising as the monomer one or more dicarboxylic acids and one or more monomers from the group of diamines, triamines, dialkanolamines or trialkanolamines and epichlorohydrin.

Preferably saturated or unsaturated, branched or unbranched $C_2$-$C_{10}$ dicarboxylic acids, preferably $C_3$-$C_9$ dicarboxylic acids, $C_4$-$C_8$ dicarboxylic acids, $C_5$-$C_7$ dicarboxylic acids, in particular adipic acid are used as the dicarboxylic acid monomers. Especially suitable as the second monomer of the binder polymer are linear and branched, substituted and unsubstituted diamines and triamines, in particular N-(2-aminoethyl)-1,2-ethanediamine. Preferably used dialkanolamines and trialkanolamines include, for example, diethanolamine, N-alkyl-dialkanolamines such as N-methyl and N-ethyldiethanolamine and triethanolamine. For monitoring and control of the molecular weight and/or the chain length, one or more monovalent amines such as monoalkanolamines may be used during the polycondensation.

Monoethanol is used preferably. The resulting intermediate product is reacted further with epichlorohydrin.

According to a preferred embodiment of the present invention, the cationic epichlorohydrin resin is a copolymer of adipic acid with N-(2-aminoethyl)-1,2-ethanediamine and epichlorohydrin.

According to one embodiment of the present invention, the at least one cationic polymer is a mixture of two or more of the aforementioned polymers. According to another embodiment of the present invention, the at least one cationic polymer consists of one of the aforementioned polymers.

According to one preferred embodiment, the at least one cationic polymer is polyDADMAC. According to another preferred embodiment, the at least one cationic polymer is a cationic starch.

The at least one cationic polymer can be provided in an aqueous form, e.g., in the form of a water-based solution, or in form of an organic solution, e.g., in an organic solvent selected from the group comprising methanol, ethanol, acetone, and mixtures thereof. However, the at least one cationic polymer also may be provided in form of an emulsion or a dispersion of water and/or organic solvents, or in form of a mixture of a solution and/or an emulsion and/or a dispersion of water and/or organic solvents.

If the at least one cationic polymer is provided in form of a solution, the solution is preferably prepared in that the at least one cationic polymer is added to a solvent, preferably water, having a temperature of at least 50° C., preferably between 50° C. and 100° C., more preferably between 60° C. and 98° C. and most preferably between 70° C. and 96° C. For example, the solution is prepared in that the at least one cationic polymer is added to water having a temperature of between 80° C. and 96° C., like between 90° C. and 96° C.

Alternatively, the starch solution is prepared in that the at least one cationic polymer is added to a solvent, preferably water, having a temperature of below 50° C., preferably between 5° C. and 50° C., more preferably between 10° C. and 40° C. and most preferably from 15° C. and 30° C.

In one preferred embodiment, the cationic polymer solution is prepared in that the at least one cationic polymer is added to water at about room temperature, i.e. at a temperature of 20° C.±2° C.

According to an alternative embodiment, the at least one cationic polymer is provided in dry form, e.g. in form of a dry powder.

In case the at least one cationic polymer is provided in the form of a dispersion, the particle size of the cationic polymer can have a $d_{50}$ value from 10 to 500 nm, preferably from 20 to 100, and more preferably from 25 to 80 nm.

The at least one cationic polymer of step c) may be provided in form of a solution or dry material, preferably in form of an aqueous solution having a concentration from 1 to 70 wt.-%, preferably from 2 to 55 wt.-%, more preferably from 5 to 50 wt.-%, and most preferably from 30 to 50 wt.-%, based on the total weight of the solution.

According to one embodiment of the present invention, the cationic polymer is added in an amount such that the charge density of the obtained self-binding pigment particles is lower compared to self-binding pigment particles not containing the cationic polymer. For example, the cationic polymer can be added in an amount such that the charge density of the obtained self-binding pigment particle is between −100 and −5 µEq/g, preferably between −80 and −10 µEq/g, and more preferably between −70 and −15 µEq/g.

According to one embodiment of the present invention, the at least one cationic polymer of step c) is added in an amount from 0.001 to 20 wt.-%, preferably from 0.005 to 15 wt.-%, more preferably from 0.01 to 10 wt.-%, and most preferably from 0.05 to 5 wt.-% or from 0.5 to 2.5 wt.-%, based on the total weight of the dry calcium carbonate containing material.

According to a preferred embodiment of the present invention, the at least one cationic polymer of step c) is polyDADMAC, preferably added in an amount from 0.05 to 5 wt.-%, more preferably from 0.5 to 2.5 wt.-%, based on the total weight of the dry calcium carbonate containing material.

According to another preferred embodiment of the present invention, the at least one cationic polymer of step c) is a cationic starch, preferably added in an amount from 0.05 to 5 wt.-%, more preferably from 0.5 to 2.5 wt.-%, based on the total weight of the dry calcium carbonate containing material.

According to a preferred embodiment of the present invention, the anionic binder of step b) is at least one carboxymethylcellulose, and the at least one cationic polymer of step c) is polyDADMAC, wherein the binder is added in an amount from 0.5 to 2.5 wt.-%, preferably 1.0 to 2.0 wt.-%, and the cationic polymer is added in an amount from 0.5 to 2.5 wt.-%, preferably from 0.8 to 2.0 wt.-%, based on the total weight of the dry calcium carbonate containing material.

According to an exemplary embodiment, the anionic binder of step b) is a carboxymethylcellulose, and the at least one cationic polymer of step c) is polyDADMAC, wherein the binder is added in an amount of about 2.0 wt.-%, and the cationic polymer is added in an amount from 0.8 to 2.0 wt.-%, based on the total weight of the dry calcium carbonate containing material.

According to another exemplary embodiment, the calcium carbonate containing material is calcium carbonate, preferably ground calcium carbonate, the anionic binder of step b) is a carboxymethylcellulose, and the at least one cationic polymer of step c) is polyDADMAC, wherein the binder is added in an amount of about 2.0 wt.-%, and the cationic polymer is added in an amount from 0.8 to 2.0 wt.-%, based on the total weight of the dry calcium carbonate containing material.

According to a preferred embodiment of the present invention, the anionic binder of step b) is at least one carboxymethylcellulose, and the at least one cationic polymer of step c) is a cationic starch, wherein the binder is added in an amount from 0.5 to 2.5 wt.-%, preferably 1.0 to 2.0 wt.-%, and the at least one cationic polymer is added in an amount from 0.5 to 2.5 wt.-%, preferably from 0.7 to 2.0 wt.-%, based on the total weight of the dry calcium carbonate containing material.

According to an exemplary embodiment, the anionic binder of step b) is a carboxymethylcellulose, and the at least one cationic polymer of step c) is a cationic starch, wherein the binder is added in an amount of about 0.5 wt.-%, and the cationic polymer is added in an amount of about 1.5 wt.-%, based on the total weight of the dry calcium carbonate containing material.

According to another exemplary embodiment, the calcium carbonate containing material is calcium carbonate, preferably ground calcium carbonate, the anionic binder of step b) is a carboxymethylcellulose, and the at least one cationic polymer of step c) is a cationic starch, wherein the binder is added in an amount of about 0.5 wt.-%, and the cationic polymer is added in an amount of about 1.5 wt.-%, based on the total weight of the dry calcium carbonate containing material.

Step d): Mixing

In step d) of the process of the present invention, the suspension of step a) and the binder of step b) are mixed.

According to one embodiment of the present invention, the at least one cationic polymer of step c) is mixed in step d) with the suspension of step a) and the binder of step b).

According to one embodiment of the present invention, the suspension of step a) is, in a first step, mixed with the binder of step b), and then, in a second step, is mixed with the at least cationic polymer of step c).

According to another embodiment of the present invention, the suspension of step a) is, in a first step, mixed with the binder of step b), and then, in a second step, is mixed with the at least one cationic polymer of step c), wherein in the first step the suspension of step a) is mixed with a first part of the binder of step b), the obtained mixture is ground and then mixed with the remaining part of the binder of step b).

According to another embodiment of the present invention, the binder of step b) is, in a first step, mixed with the cationic polymer of step c), and then, in a second step, is mixed with the suspension of step a).

According to still another embodiment of the present invention, the suspension of step a) is mixed with the binder of step b) and the cationic polymer of step c) in one step.

According to one exemplary embodiment of the present invention, in a first step, the suspension of step a) is mixed with the binder of step b), wherein said binder is provided in form of a solution, and then, in a second step, the at least one cationic polymer of step c) is added to the suspension in form of a dry powder.

According to another exemplary embodiment of the present invention, in a first step, the at least one cationic polymer of step c) is mixed with the binder of step b) to form a premixed solution, wherein the cationic polymer and the binder are provided in form of a solution, and then, in a second step, the premixed solution is mixed with the suspension of step a).

The mixing step d) may be carried out under mixing and/or homogenizing conditions. The skilled person will adapt these mixing and/or homogenizing conditions such as the mixing speed and temperature according to his process equipment. For example, the mixing and homogenizing may take place by means of a plowshare mixer. Plowshare mixers function by the principle of a fluidized bed produced mechanically. Plowshare blades rotate close to the inside wall of a horizontal cylindrical drum and convey the components of the mixture out of the product bed and into the open mixing space. The fluidized bed produced mechanically ensures intense mixing of even large batches in a very short time. Choppers and/or dispersers are used to disperse lumps in a dry operation. Equipment that may be used in the inventive process is available, for example, from Gebrüder Lödige Maschinenbau GmbH, Germany, or from Silverson, U.S.A. Furthermore, a tubular mixing apparatus, for example, from Ystral GmbH, Ballrechten-Dottingen, Germany may be used. Another equipment that may be used in the inventive process is a MEGATRON® Inline homogenizer from Kinematika AG, Switzerland.

According to one embodiment of the present invention, process step d) is carried out using a fluidized bed mixer or plowshare mixer.

The process step d) may be carried out at room temperature, i.e. at a temperature of 20° C.±2° C., or at other temperatures. According to one embodiment the process step d) is carried out at a temperature from 5 to 140° C., preferably from 10 to 110° C., and most preferably from 20 to 105° C. Heat may be introduced by internal shear or by an external source or a combination thereof.

According to an exemplary embodiment of the invention, the suspension of step a) and/or the anionic polymeric binder of step b) is preheated before these components are mixed in process step d). For example the suspension of step a) and/or the anionic polymeric binder of step b) may be preheated to a temperature from 30 to 100° C., from 40 to 90° C., or preferably from 50 to 80° C. According to another exemplary embodiment of the invention, the suspension of step a) and/or the anionic polymeric binder of step b) and/or the at least one cationic polymer of step c) is preheated before these components are mixed in process step d). For example the suspension of step a) and/or the anionic polymeric binder of step b) and/or the at least one cationic polymer of step c) may be preheated to a temperature from 30 to 100° C., from 40 to 90° C., or preferably from 50 to 80° C.

According to one embodiment of the present invention, process step d) is carried out for at least 1 s, preferably for at least 1 min, e.g., for at least 15 min, 30 min, 1 hour, 2 hours, 4 hours, 6 hours, 8 hours, or 10 hours.

To ensure a better dispersion, a dispersant may also be added to any of the components used in the inventive process, e.g., in the form of an aqueous solution and/or a powder of a dispersant. A suitable dispersant is preferably selected from the group comprising homopolymers or copolymers of polycarboxylic acid salts based on, for example, acrylic acid, methacrylic acid, maleic acid, fumaric acid or itaconic acid and acrylamide or mixtures thereof. Homopolymers or copolymers of acrylic acid are especially preferred. The weight average molecular weight $M_w$ of such products is preferably in the range from 2000 to 15000 g/mol, with a weight average molecular weight $M_w$ from 3000 to 7000 g/mol or 3500 to 6000 g/mol being especially preferred. According to an exemplary embodiment, the dispersant is sodium polyacrylate having a weight average molecular weight $M_w$ from 2000 to 15000 g/mol, preferably from 3000 to 7000 g/mol, and most preferably from 3500 to 6000 g/mol.

According to a preferred embodiment, no dispersant is added in process step d).

The mixing step may be carried out at a high solid content, i.e. at a solid content from 50 to 80 wt.-%, based on the total weight of the suspension. However, the mixing step can be carried out at a solid content of more than 80 wt.-%, based on the total weight of the suspension, e.g. by using a ploughshare mixer.

The solids content of the suspension can be adjusted by the methods known to the skilled person. To adjust the solids content of an aqueous mineral material comprising suspension, the suspension may be partially or fully dewatered by a filtration, centrifugation or thermal separation process. For example, the suspensions may be partially or fully dewatered by a filtration process such as nanofiltration or a thermal separation process such as an evaporation process. Alternatively, water may be added to the solid mineral material (e.g. resulting from filtration) until the desired solids content is obtained. Additionally or alternatively, a self-binding pigment particle suspension or other pigment particle suspension having an appropriate lower content of solid particles may be added to the particulate material of the mixed suspension until the desired solid content is obtained. The additionally added self-binding pigment particle suspension or other pigment particles suspensions can be dispersed or undispersed.

According to one embodiment of the present invention, the solids content of the mixed suspension of step d) is adjusted so that it is from 10 to 80 wt.-%, more preferably from 20 to 70 wt.-%, most preferably from 40 to 65 wt.-%, based on the total weight of the suspension.

According to a preferred embodiment of the present invention, the solid content of the mixed suspension of step d) is adjusted to a high solid content so that it is from 50 to 80 wt.-%, more preferably from 60 to 79 wt.-%, most preferably from 65 to 78 wt.-%, based on the total weight of the suspension.

Step e)

In step e) of the process according to the present invention, the mixed suspension of step d) is ground.

According to one embodiment, the aqueous environment of the suspension to be ground has a pH from 7 to 12, preferably from 8 to 11, and more preferably from 8.5 to 10.5.

The grinding process may be undertaken by all the techniques and grinders well known to the man skilled in the art for wet grinding. The grinding step may be carried out with any conventional grinding device, for example, under conditions such that comminution predominantly results from impacts with a secondary body, i.e. in one or more of: a ball mill, a rod mill, a vibrating mill, a centrifugal impact mill, a vertical bead mill, an attrition mill, or other such equipment known to the skilled person. The grinding step e) may be carried out in batch or continuously, preferably continuously.

According to one embodiment of the present invention, the grinding step e) is carried out at a temperature from 5 to 110° C., from 10 to 100° C., from 15 to 80° C., or from 20° C. to 25° C. For example, grinding step e) is carried out at a temperature of at least 50° C., preferably between 50° C. and 100° C., more preferably between 60° C. and 90° C. and most preferably between 60° C. and 70° C. Alternatively, grinding step e) is carried out at a temperature of below 50° C., preferably between 10° C. and 50° C., more preferably between 20° C. and 40° C. and most preferably between 20° C. and 30° C. For example, grinding step e) is carried out at room temperature, i.e. at a temperature of 20° C.±2° C.

In one preferred embodiment of the present invention, grinding step e) is carried out until the fraction of self-binding pigment particles having a particle size of less than 1 µm is greater than 10 wt.-%, preferably greater than 20 wt.-%, more preferably greater than 30 wt.-%, and most preferably greater than 50 wt.-%, based on the total weight of the pigment particles, as measured with a Mastersizer 2000.

Additionally or alternatively, grinding step e) is carried out until the fraction of self-binding pigment particles having a particle size of less than 2 µm is greater than 20 wt.-%, preferably greater than 40 wt.-%, more preferably greater than 60 wt.-%, and most preferably greater than 80 wt.-%, based on the total weight of the pigment particles, as measured with a Mastersizer 2000.

Additionally or alternatively, the self-binding pigment particles obtained by the process of the present invention may have a weight median particle diameter $d_{50}$, measured according to the sedimentation method, in the range of from 0.1 µm to 10 µm, preferably from 0.5 µm to 8 µm and most preferably from 0.8 µm to 6 µm, for example from 1.0 µm to 5.5 µm. Additionally or alternatively, the self-binding pigment particles obtained in step e) may have a $d_{98}$ of less than 25 µm, preferably of less than 20, more preferably of less than 15, and most preferably of less than 10 µm.

According to one embodiment of the present invention, the at least one cationic polymer of step c) is mixed with the suspension obtained in grinding step e) and the obtained mixture is deagglomerated.

The mixing may be carried out in the same way as described under step d) above.

For deagglomeration of the obtained mixture, an inline homogenizer may be used, for example, Megatron® inline homogenizer from Kinematika AG, Switzerland.

Further, Optional Process Steps

According to an optional embodiment of the present invention, the process further comprises a step of concentrating the suspension of self-binding pigment particles obtained by the process of the present invention.

The solids content of the obtained self-binding pigment particle suspension can be adjusted by concentrating methods known to the skilled person. The concentrating of the corresponding pigment material suspension may be achieved by means of a thermal process, for example in an evaporator, or by means of a mechanical process, for example in a filter press such as nano filtration, and/or centrifuge.

The solid content of the self-binding pigment particle suspension obtained by the process of the present invention can be concentrated so that it is from 10 to 80 wt.-%, more preferably from 20 to 70 wt.-%, most preferably from 40 to 60 wt.-%, based on the total weight of the suspension. According to one preferred embodiment, the solid content of the obtained self-binding pigment particle suspension is concentrated to a medium solid content so that it is from 50 to 60 wt.-%. Alternatively, the solid content of the obtained self-binding pigment particle suspension can be concentrated to a high solid content so that it is from 50 to 80 wt.-%, more preferably from 60 to 79 wt.-%, most preferably from 65 to 78 wt.-%, based on the total weight of the suspension.

According to one optional embodiment of the present invention, the step of concentrating the self-binding particle suspension obtained by the process of the present invention is carried out such that a dry product is obtained. The term "dry product" is understood to refer to pigment particles having a total surface moisture content of less than 0.5 wt.-%, preferably less than 0.2 wt.-% and more preferably less than 0.1 wt.-%, based on the total weight of the pigment particles.

If the inventive process further comprises the optional step of concentrating the obtained self-binding pigment particle suspension such that a dry product or a suspension having a solids content of at least 65 wt.-%, more preferably at least 80 wt.-% and most preferably at least 90 wt.-%, based on the total weight of the self-binding pigment particle suspension, is obtained, the dry product or the suspension may be rediluted. If the dry product or the suspension is rediluted, the solids content in the obtained suspension is adjusted such that it is at least 1 wt.-%, preferably from 1 wt.-% to 80 wt.-%, more preferably from 5 wt.-% to 60 wt.-%, even more preferably from 10 wt.-% to 50 wt.-%, and most preferably from 15 wt.-% to 45 wt.-%, based on the total weight of the self-binding pigment particle suspension.

In one preferred embodiment of the present invention, the process of the present invention may lead directly to high solids suspension of self-binding pigment particles, i.e. to a suspension having a solid content from 50 to 80 wt.-%, based on the total weight of the self-binding pigment particle suspension, which means that an additional concentration step is not implemented in the process of the present invention.

To ensure a better dispersion, a dispersant may also be added to any of the components used in the inventive process, e.g., in the form of an aqueous solution and/or a powder of a dispersant. A suitable dispersant is preferably selected from the group comprising homopolymers or copolymers of polycarboxylic acid salts based on, for example, acrylic acid, methacrylic acid, maleic acid, fumaric acid or itaconic acid and acrylamide or mixtures thereof. Homopolymers or copolymers of acrylic acid are especially preferred. The weight average molecular weight $M_w$ of such products is preferably in the range from 2000 to 15000 g/mol, with a weight average molecular weight $M_w$ from 3000 to 7000 g/mol or 3500 to 6000 g/mol being especially preferred. According to an exemplary embodiment, the dispersant is sodium polyacrylate having a weight average molecular weight $M_w$ from 2000 to 15000 g/mol, preferably from 3000 to 7000 g/mol, and most preferably from 3500 to 6000 g/mol.

According to a preferred embodiment, no dispersant is added in any of the process steps, preferably no dispersant is added in process step e).

The Self-Binding Pigment Particle Suspension

According to a further aspect, the present invention refers to a self-binding pigment particle suspension which is obtainable by the process according to the present invention.

The inventive self-binding pigment particle suspension preferably has a low amount of free polymer in the water phase of the suspension. The total content of polymer in the water phase can be determined after drying at 120° C. by measuring the loss on ignition (LOI) values at 570° C. To determine the content of free polymer the suspension is diluted and centrifuged. The filter cake is dried at 120° C. and the loss on ignition value at 570° C. measured. The difference between the two LOI values is referred to as delta LOI (dLOI). A method for determining the loss of ignition, and dLOI is described in the Examples section.

According to one embodiment of the present invention, the amount of free polymer in the water phase of the inventive self-binding pigment particles suspension is below 70 wt.-%, preferably below 50 wt.-%, more preferably below 30 wt.-%, and most preferably below 25 wt.-%, based on the total amount of polymer added to the suspension of the calcium carbonate containing material.

According to another embodiment of the present invention, the charge density of the inventive self-binding pigment particles is between −100 and −5 µEq/g, preferably between −90 and −20 µEq/g, more preferably between −80 and −40 µEq/g, and most preferably between −75 and −60 µEq/g.

The inventive self-binding pigment particles can have a specific surface area of from 0.1 to 200 m$^2$/g, preferably from 1 to 25 m$^2$/g, more preferably from 2 to 15 m$^2$/g, and most preferably from 3 to 12 m$^2$/g, measured using nitrogen and the BET method according to ISO 9277:2010.

According to a further aspect of the present invention, the self-binding pigment particle suspension obtainable by the inventive process is used in paper, plastics, paint, coatings, concrete and/or agriculture applications, e.g. as filler material.

According to an exemplary embodiment of the present invention, the self-binding particle suspension obtainable by the inventive process is used in paper, e.g., in wet end process of a paper machine, preferably in cigarette paper, board and/or coating applications, or preferably as support for rotogravure and/or offset and/or ink jet printing and/or continuous ink jet printing and/or flexography and/or electrography and/or decoration surfaces.

Another application is the coating of tree leaves and/or plant leaves to reduce sun light and UV exposure of the leave surface.

According to a further aspect of the present invention, a paper product comprising the inventive self-binding pigment particles is provided, wherein the pigment particles comprise calcium carbonate containing material particles which are at least partially coated with an anionic polymer binder comprising at least one modified polysaccharide and at least one cationic polymer.

According to one embodiment, the paper product comprising the inventive self-binding pigment particles has a higher bending stiffness compared to a paper product, wherein the inventive self-binding pigment particles are replaced by the same amount of calcium carbonate containing material particles. According to one embodiment of the present invention, the bending stiffness is at least 5% higher, preferably at least 7% higher, and more preferably at least 10% higher compared to the bending stiffness of a paper product, wherein the inventive self-binding pigment particles are replaced by the same amount of calcium carbonate containing material particles.

According to an exemplary embodiment the paper comprising the inventive self-binding pigment particles as filler material has a bending stiffness of at least 0.25 mNm, preferably at least 0.30 mNm at a filler loading of 20 wt.-%.

It is to be understood that the advantageous embodiments described above with respect to the inventive method for making self-binding pigment particles also can be used for preparing or defining the inventive suspension and its use. In other words, the preferred embodiments described above and any combinations of these embodiments can also be applied to the inventive suspension and its use.

The scope and interest of the invention will be better understood based on the following figures and examples which are intended to illustrate certain embodiments of the invention and are non-limitative.

EXAMPLES

1. Measurement Methods

Figure 1:
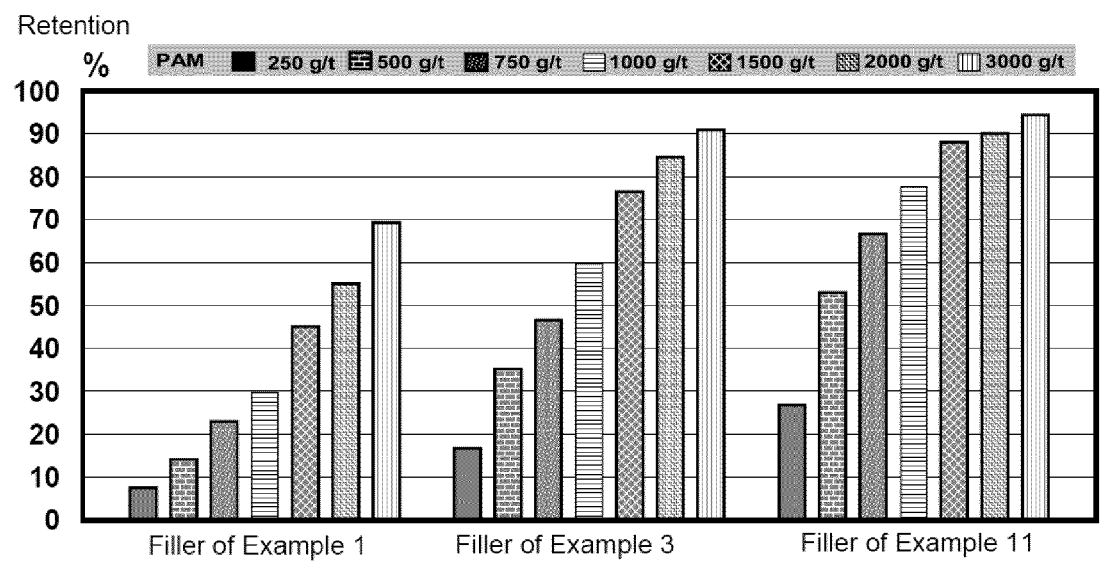
FIG. 1 shows the relative retention values obtained for paper suspensions comprising the pigment particles of Example 1, 3, and 11 as fillers, wherein the pulp was diluted in tap water.

In the following, materials and measurement methods implemented in the examples are described.

Brookfield Viscosity

The Brookfield viscosity of the self-binding pigment particles suspension was measured after one hour of production and after one minute of stirring at room temperature at 100 rpm by the use of a Brookfield viscometer type RVT equipped with an appropriate spindle.

Particle Size

The particle distribution of the ground calcium carbonate particles was measured using a Sedigraph 5120 from the company Micromeritics, USA. The particle size distribution of the inventive self-binding pigment particles was measured using a Mastersizer 2000 from the company Malvern Instruments Ltd, England. The method and the instruments are known to the skilled person and are commonly used to determine grain size of fillers and pigments. The measurement was carried out in an aqueous solution comprising 0.1 wt.-% $Na_4P_2O_7$. The samples were dispersed using a high speed stirrer and supersonics.

Solids Content of an Aqueous Suspension

The suspension solids content (also known as "dry weight") was determined using a Moisture Analyser HR73 from the company Mettler-Toledo, Switzerland, with the following settings: temperature of 120° C., automatic switch off 3, standard drying, 5 to 20 g of suspension.

Intrinsic Viscosity

The intrinsic viscosity was determined by a Schott AVS 370 system. The samples were dissolved in a 0.2 M NaCl solution, and subsequently, the pH was adjusted to 10 with NaOH. Measurements were performed at 25° C. with a capillary type 0a and corrected using the Hagenbach correction.

Polyelectrolyte Titration (PET)

The polyelectrolyte content in the aqueous suspension was determined using a Memotitrator Mettler DL 55 equipped with a Phototrode DP 660 commercialised by Mettler-Toledo, Switzerland. The measurements of the poylelectrolyte content was carried out by weighing a sample of the calcium carbonate suspension into a titration vessel and diluting said sample with deionized water up to a volume of approximately 40 ml. Subsequently, 10 ml of 0.01 M cationic poly(N,N-dimethyl-3,5-dimethylene-piperidinium chloride) (PDDPC; obtained from ACROS Organics, Belgium) were slowly added under stirring into the titration vessel within 5 min and than the content of the vessel was stirred for another 20 min. Afterwards the suspension was filtered trough a 0.2 µm mix-ester membrane filter (Ø 47 mm) and washed with 5 ml of deionized water. The thus obtained filtrate was diluted with 5 ml of phosphate buffer pH 7 (Riedel-de Haën, Germany) and than 0.01 M of a potassium polyvinylsulfate (KPVS; obtained from SERVA Feinbiochemica, Heidelberg) solution was added slowly to the filtrate to titrate the excess of cationic reagent. The endpoint of titration was detected by a Phototrode DP660, which was adjusted to 1200 to 1400 mV in deionized water, prior to such measurement. The charge calculation was carried out according to the following evaluation:

$$Q_{atro} = \frac{((V_{PDDPC} * t_{PDA}) - V_{KPVS}) * (-1000)}{E_P * Fk} [\mu Val/g]$$

$$w_{atro} = -\frac{Q_{atro}}{K_{DM} * 100} [\%]$$

Calculation of the optimal sample weight:

$$E_P = \frac{60}{w_{DM} * K_{DM} * Fk}$$

Calculation of adapted sample weight for 4 ml consumption:

$$E_{4ml} = \frac{E_1 * 6}{(10 - V_{KPVS,1})}$$

Abbreviations
$E_P$=sample weight [g]
$w_{DM}$=Dispersing agent content in [%]
$K_{DM}$=Dispersing agent constant [µVal/0.1 mg dispersing agent]
Fk=Solids content [%]
$V_{PDDPC}$=Volume PDDPC [ml]
$V_{KPVS}$=Volume KPVS [ml]
$t_{PDDPC}$=Titer PDDPC
$E_{DM}$=Dispersing agent weight [mg]
Q=Charge [µVal/g]
$w_{atro}$=Dispersing agent content atro [%]
$E_1$=Sample weight of experiment to be optimised [g]
$V_{KPVS,1}$=experimental consumption KPVS [ml] of experiment to be optimised
Loss on Ignition (LOI) Method and Free Polymer For the measurement of the loss on ignition, samples of the self-binding pigment material suspensions were dried in a microwave at approximately 200 W for about 75 min such that the samples had maximum moisture of about 0.5 wt.-%, based on the total weight of the particulate material. Subsequently, the dried samples were de-agglomerated by using a RETSCH ultra-centrifugal mill (type ZM) with 200 µm screen and rotor having 24 teeth. 3 to 4 g of the obtained sample was weighed into a porcelain crucible and heated in a muffle oven at about 570° C. until constant mass. After cooling in a desiccator, the porcelain crucible was weighed with the obtained residue. The values given herein are the average of two measurements of independently prepared samples.

The loss on ignition is an absolute measurement displayed in percent and calculated according to the following formula:

$$LOI(\text{slurry}) = \frac{100 * (m_1 - m_2)}{m_1}$$

with
$m_1$: mass of initial weight [g]
$m_2$: mass after heating to about 570° C. in a muffle oven [g]

An aliquot of the slurry was diluted with deionised water to a concentration of 10 wt.-%, based on the total weight of the slurry. The suspension was stirred for 5 minutes. The suspension was centrifuged with a lab centrifuge at 2600 g for 15 minutes. The upper water phase was poured and the sedimented cake was dried in a microwave at approximately 200 W for about 75 min such that the samples had a maximum moisture content of about 0.5 wt.-%, based on the total weight of the particulate material. Subsequently, the dried samples were de-agglomerated by using a RETSCH ultra-centrifugal mill (type ZM) with 200 µm screen and rotor having 24 teeth. 3 to 4 g of the obtained sample was weighed into a porcelain crucible and heated in a muffle oven at about 570° C. until constant mass. After cooling in a desiccator, the porcelain crucible was weighed with the obtained residue. The values given herein are the average of two measurements of independently prepared samples.

The loss on ignition is an absolute measurement displayed in percent and calculated according to the following formula:

$$LOI(\text{cake}) = \frac{100 * (m_1 - m_2)}{m_1}$$

with
$m_1$: mass of initial weight [g]
$m_2$: mass after heating to about 570° C. in a muffle oven [g]

The amount of free polymer can be calculated according to the following formula:

$$\text{Free polymer \%} = 100 - \frac{LOI(\text{cake}) - 0.6\%}{LOI(\text{slurry}) - 0.6\%} * 100$$

The LOI of the original GCC was found to be 0.6% and this is taken into account by subtracting these 0.6%.
Whiteness (R457) and Yellowness Index Measurement Whiteness and yellowness index was determined according to norm TAPPI T452/ISO 247. Glossiness was determined according to DIN 54 502/TAPPI 75.
Turbidity The turbidity was measured with a Hach Lange 2100AN IS Laboratory Turbidimeter and the calibration was performed using StabCal turbidity standards (formazin standards) of <0.1, 20, 200, 1000, 4000, and 7500 NTU (Nephelometric Turbidity Units).
Chemical Oxygen Demand Chemical oxygen demand (COD) was measured according to the Lange Method (ISO 15705), as described in the document issued by HACH LANGE LTD, entitled "DOC042.52.20023.Nov08". Approximately, 2 ml of the liquid phase were added in a Lange CSB LCK 014 cuvette, covering a range between 1000 and 10000 mg/l and heated in the closed cuvette for two hours at 148° C. in a dry thermostat. This suspension was then analyzed according to the Lange Method.

2. Examples 1 to 12

Example 1

GCC with CMC (Comparative Example)

A chemical free calcium carbonate from Norway, Molde, having a fineness corresponding to a $d_{50}$ value of 0.8 μm and a $d_{98}$ value of 5.0 μm was employed as ground calcium carbonate (GCC). The specific surface (BET) of the ground calcium carbonate was 7.5 m$^2$/g and the charge density was −24.8 μEq/g. The GCC was provided in the form of a filter cake having a solids content of 70.0 wt.-%.

The anionic polymeric binder was a carboxymethylcellulose (CMC) having a molecular weight of 90000 g/mol (No. 419273, commercially available from Sigma Aldrich, Germany). The intrinsic viscosity of the CMC was 327 ml/g, and the degree of substitution (degree of carboxylation) was 0.7. The CMC was used in form of an aqueous solution containing 6 wt.-% CMC, based on the total amount of the solution.

A slurry with a solid content of 50.0 wt.-%, based on the total amount of the slurry, was prepared from the GCC filter cake by adding 2.0 wt.-% CMC, based on the total weight of the dry ground calcium carbonate.

The obtained slurry had a Brookfield viscosity of 237 mPas. The particle size distribution of the pigment particles, measured on a Sedigraph 5120, had a fraction of 88 wt.-% smaller than 2 μm, and 61 wt.-% smaller than 1 μm.

The obtained slurry was wet ground at room temperature. The wet grinding of slurry was done in a vertical attritor mill (Dynomill®, Bachofen, Switzerland) having a volume of 600 cm$^3$ at a speed of 2500 rpm and at a flow rate of 500 cm$^3$/min. 480 cm$^3$ (80%) of the grinding chamber was filled with grinding beads having a diameter of 0.6-1.0 mm (melt fused beads consisting of 68% baddeleyit and 32% amorphous silicate). The slurry was passed four times through the mill.

The product obtained was analyzed with respect to particle size, specific surface (BET), brightness, electrochemical charge (PET), and LOI. Tables 2 and 3 summarize the properties of the obtained slurry and the pigment particles contained therein.

Examples 2 to 8

GCC with CMC and polyDADMAC (Inventive Examples)

A chemical free calcium carbonate from Norway, Molde, having a fineness corresponding to a $d_{50}$ value of 0.8 μm and a $d_{98}$ value of 5.0 μm was employed as ground calcium carbonate (GCC). The specific surface (BET) of the ground calcium carbonate was 7.5 m$^2$/g and the charge density was −24.8 μEq/g. The GCC was provided in the form of a filter cake having a solids content of 70.0 wt.-%.

The anionic polymeric binder was a carboxymethylcellulose (CMC) having a molecular weight of 90 000 g/mol (No. 419273, commercially available from Sigma Aldrich, Germany). The intrinsic viscosity of the CMC was 327 ml/g, and the degree of substitution (degree of carboxylation) was 0.7. The CMC was used in form of an aqueous solution containing 6 wt.-% CMC, based on the total amount of the solution.

As cationic polymer PolyDADMAC (Catiofast BP® liquid, commercially available from BASF, Germany) was employed in form of a solution containing 50 wt.-% PolyDADMAC, based on the total weight of the solution.

In a first step, a slurry with a solid content of 50.0 wt.-%, based on the total amount of the slurry, was prepared from the GCC filter cake by adding 2.0 wt.-% CMC, based on the total amount of the slurry. In a second step, polyDADMAC was added in different amounts, namely, in amounts of 0.50 wt.-% (Example 2), 1.00 wt.-% (Examples 3 and 5), 1.25 wt.-% (Example 6), 1.50 wt.-% (Example 7), 1.75 wt.-% (Example 8), and 2.00 wt.-% (Example 4), based on the total weight of the dry ground calcium carbonate (see also Table 1).

Subsequently, the obtained slurry was wet ground at room temperature. The wet grinding of slurry was done in a vertical attritor mill (Dynomill®, Bachofen, Switzerland) having a volume of 600 cm$^3$ at a speed of 2500 rpm and at a flow rate of 500 cm$^3$/min. 480 cm$^3$ (80%) of the grinding chamber were filled with grinding beads having a diameter of 0.6-1.0 mm (melt fused beads consisting of 68% baddeleyit and 32% amorphous silicate). The slurry was passed four times through the mill.

The products obtained were analyzed with respect to particle size, specific surface (BET), brightness, electrochemical charge (PET), and LOI. Tables 2 and 3 summarize the properties of the obtained slurries and the inventive self-binding pigment particles contained therein.

Examples 9 to 11

GCC with CMC and Cationic Starch (Inventive Examples)

A chemical free calcium carbonate from Norway, Molde, having a fineness corresponding to a $d_{50}$ value of 0.8 μm and a $d_{98}$ value of 5.0 μm was employed as ground calcium carbonate (GCC). The specific surface (BET) of the ground calcium carbonate was 7.5 m$^2$/g and the charge density was −24.8 μEq/g. The GCC was provided in the form of a filter cake having a solids content of 70.0 wt.-%.

The anionic polymeric binder was a carboxymethylcellulose (CMC) having a molecular weight of 90000 g/mol (No. 419273, commercially available from Sigma Aldrich, Germany). The intrinsic viscosity of the CMC was 327 ml/g, and the degree of substitution (degree of carboxylation) was 0.7. The CMC was used in form of a dry powder.

As cationic polymer, the cationic starch Cargill C*Bond (no. HR05947, commercially available from Cargill Deutschland GmbH, Germany) was employed in form of a dry powder.

Premixed solutions of starch and CMC were prepared with different amounts and ratios of cationic starch and CMC, namely, 1.5 wt.-% CMC and 0.5 wt.-% starch (Example 9), 1.0 wt.-% CMC and 1.0 wt.-% starch (Example 10), and 0.5 wt.-% CMC and 1.5 wt.-% starch (Example 11), based on the total weight of the dry ground calcium carbonate (see also Table 1). Said premixed solutions were produced by dissolving the cationic starch in water and heating the solution up to 100° C. The starch solution was cooled down to room temperature, and the CMC powder was added. The solution was stirred at room temperature for 30 to 60 min until the CMC had dissolved.

A slurry with a solid content of 50.0 wt.-%, based on the total amount of the slurry, was prepared from the GCC filter cake by adding a premixed solution of starch and CMC.

Subsequently, the obtained slurry was wet ground at room temperature. The wet grinding of slurry was done in a vertical attritor mill (Dynomill®, Bachofen, Switzerland) having a volume of 600 cm$^3$ at a speed of 2500 rpm and at a flow rate of 500 cm$^3$/min. 480 cm$^3$ (80%) of the grinding chamber were filled with grinding beads having a diameter of 0.6-1.0 mm (melt fused beads consisting of 68% baddeleyit and 32% amorphous silicate). The slurry was passed four times through the mill.

The products obtained were analyzed with respect to particle size, specific surface (BET), brightness, electrochemical charge (PET), and LOI. Tables 2 and 3 summarize the properties of the obtained slurries and the pigment particles contained therein.

Example 12

Chalk with CMC and polyDADMAC (Inventive Example)

A chalk from France, Omey, having a fraction of particles finer than 2 μm of 43% by weight, and a fraction of particles finer than 1 μm of 18% by weight was employed as ground calcium carbonate (GCC). The GCC was provided in the form of a dry powder.

The anionic polymeric binder was a carboxymethylcellulose (CMC), commercially available under the trade name Finnfix 10 from CP Kelko, USA. The intrinsic viscosity of the CMC was 135 ml/g. The CMC was used in form of an aqueous solution containing 3 wt.-% CMC, based on the total amount of the solution.

As cationic polymer PolyDADMAC (Catio fast BP® liquid, commercially available from BASF, Germany) was employed in form of a solution containing 50 wt.-% PolyDADMAC, based on the total weight of the solution.

In a first step, to the above CMC solution consisting of 2020 g water and 64 g Finnfix 10, 3000 g of the chalk were added and the resulting mixture was stirred for 10 minutes. In a second step, polyDADMAC was added in an amount of 1.80 wt.-%, based on the total weight of the dry ground calcium carbonate (see also Table 1).

Subsequently, the obtained slurry was wet ground at room temperature. The wet grinding of slurry was done in a vertical attritor mill (Dynomill®, Bachofen, Switzerland) having a volume of 600 cm$^3$ at a speed of 2500 rpm and at a flow rate of 500 cm$^3$/min. 480 cm$^3$ (80%) of the grinding chamber were filled with grinding beads having a diameter of 0.6-1.0 mm (melt fused beads consisting of 68% baddeleyit and 32% amorphous silicate). The slurry was passed four times through the mill.

The products obtained were analyzed with respect to particle size, specific surface (BET), brightness, electrochemical charge (PET), and LOI. Tables 2 and 3 summarize the properties of the obtained slurries and the inventive self-binding pigment particles contained therein.

TABLE 1

Amounts of anionic polymeric binder and cationic polymers used in Examples 1 to 12.

| Example | CMC (wt.-%) | PolyDADMAC (wt.-%) | Cationic starch (wt.-%) |
|---|---|---|---|
| 1 | 2.0 | — | — |
| 2 | 2.0 | 0.50 | — |
| 3 | 2.0 | 1.00 | — |
| 4 | 2.0 | 1.00 | — |
| 5 | 2.0 | 1.25 | — |
| 6 | 2.0 | 1.50 | — |
| 7 | 2.0 | 1.75 | — |
| 8 | 2.0 | 2.00 | — |
| 9 | 1.5 | — | 0.5 |
| 10 | 1.0 | — | 1.0 |
| 11 | 0.5 | — | 1.5 |
| 12 | 2.0 | 1.80 | — |

TABLE 2

Particle size distributions of the obtained self-binding pigment particles of Examples 1 to 12.

| | Particle size (Mastersizer 2000) | | $d_{50}$ value | $d_{98}$ value |
|---|---|---|---|---|
| Example | <2 μm (wt.-%) | <1 μm (wt.-%) | (μm) | (μm) |
| 1 | 80 | 36 | 1.24 | 4 |
| 2 | 80 | 34 | 1.26 | 4 |
| 3 | 79 | 30 | 1.32 | 4 |
| 4 | 50 | 13 | 2.01 | 7 |
| 5 | 14 | 6 | 5.18 | 15 |
| 6 | 11 | 6 | 5.41 | 15 |
| 7 | 13 | 6 | 4.97 | 15 |
| 8 | 16 | 7 | 3.99 | 11 |
| 9 | 78 | 32 | 1.31 | 4 |
| 10 | 76 | 30 | 1.35 | 4 |
| 11 | 67 | 21 | 1.57 | 5 |
| 12 | 74 | 36 | 1.39 | 5 |

TABLE 3

Particle size distributions of the obtained self-binding pigment particles of Examples 1 to 12.

| | Examples | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| Specific surface area (BET) (m$^2$/g) | 5.2 | 5.1 | 5.0 | 4.9 | 4.8 | 4.6 | 4.6 | 4.9 | 5.8 | 5.6 | 5.3 | 3.6 |

TABLE 3-continued

Particle size distributions of the obtained self-binding pigment particles of Examples 1 to 12.

| | Examples | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| Brightness R457 (%) | 93.9 | 93.9 | 93.7 | 94.0 | 94.0 | 93.9 | 93.9 | 93.8 | 94.1 | 94.1 | 94.3 | 82.1 |
| Charge density (PET) (µEq/g) | −115 | −93 | −72 | −55 | −45 | −30 | −21 | −24 | −79 | −62 | −51 | −63 |
| LOI slurry (%) | 3.2 | 4.2 | 4.3 | 4.3 | 4.3 | 4.6 | 4.9 | 5.4 | 3.2 | 3.3 | 3.1 | 3.6 |
| LOI cake (%) | 1.4 | 1.7 | 3.5 | 3.4 | 3.9 | 4.1 | 4.2 | 4.8 | 1.7 | 2.1 | 2.9 | 2.4 |
| Free polymer in solution (%) | 69 | 69 | 22 | 24 | 11 | 13 | 16 | 13 | 58 | 44 | 8 | 40 |

Results of Examples 1 to 12

From the measured details, it can be gathered that the charge density of the self-binding pigment particles comprising the cationic polymer polyDADMAC is linearly reduced with the addition of the cationic polymer. A similar trend is observed for the self-binding pigment particles comprising Cargill C*Bond as cationic polymer.

Furthermore, the results show that with increasing amount of cationic polymer, the amount of total polymer which is absorbed at the surface of the self-binding pigment particle increases and the amount of free polymer in the aqueous phase decreases, respectively (see Table 3, last two lines).

The measured brightness R457 values measured for the produced self-binding pigment particles hardly differ from each other (see Table 3), which means that the presence of the cationic polymer on the surface of the self-binding does not have an impact on the optical properties of the pigment particles.

3. Example 13

Retention Studies

The self-binding pigment particles of comparative Example 1 and inventive Examples 3 and 11 were tested as paper fillers in a dynamic retention study using the DFS 03 (BTG Mütek GmbH).

Thermo mechanical pulp (TMP) fibers were used for the retention study. The pulp was either diluted in tap water which was treated with 0.057 g/l of a sodium polyacrylic acid homopolymer having a molecular weight of 3500 g/mol and a polydispersity D=2.5, or with clear filtrate, i.e. the water that was used in the paper mill for the dilution of the pulp. 6.00 g/l fibers were mixed with 6.00 g/l filler to obtain a pulp consistency of the pulp/filler mix of 12.0 g/l as in the headbox of a paper machine. The filler was added within 1 min stirring time by 10 s stirring at 800 rpm, 10 s stirring at 1200 rpm, 5 s stirring at 1000 rpm, and 5 s stirring at 800 rpm, wherein after 20 s Percol PBR 30 special powder (commercially available from BASF, Germany) in form of 0.2% solution was added as retention aid. After additional 30 s, the valve was opened. The tests were carried out with different concentrations of retention aid, namely, with 250 g/t, 500 g/t, 750 g/t, 1000 g/t, 1500 g/t, 2000 g/t, and 3000 g/t. The relative retention was determined by measuring the turbidity NTU of the clear filtrate and the sample filtrates over time:

$$\text{Relative retention }[\%] = \frac{T_0 - T_t}{T_0} \cdot 100\%$$

wherein $T_0$ is the turbidity of the clear filtrate and $T_t$ is the turbidity of the sample filtrate at the moment t.

Figure 2:
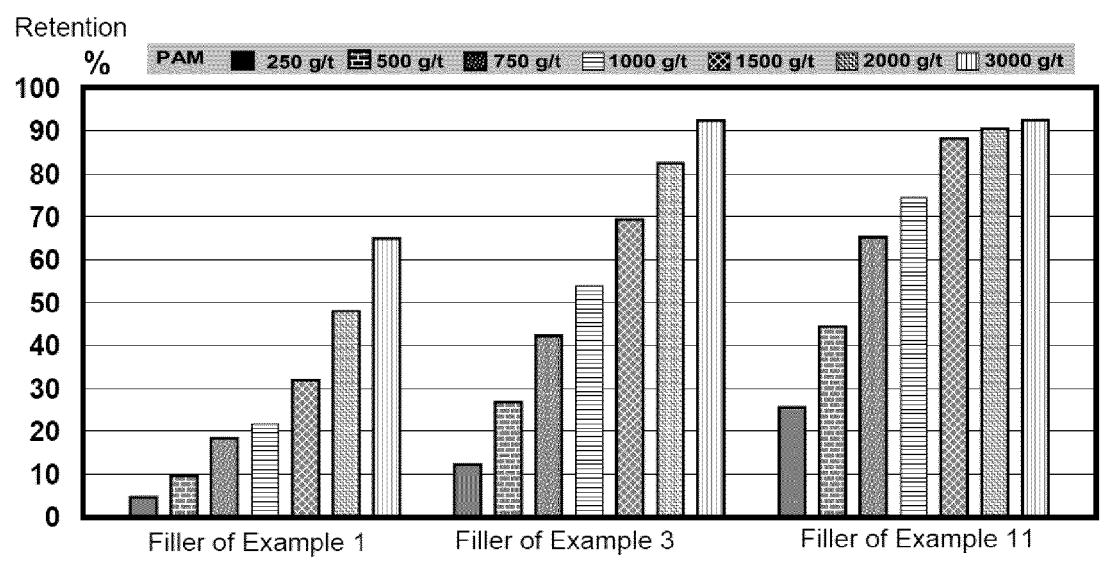
FIG. 2 shows the relative retention values obtained for paper suspensions comprising the pigment particles of Example 1, 3, and 11 as fillers, wherein the pulp was diluted in clear filtrate.
Figure 3:
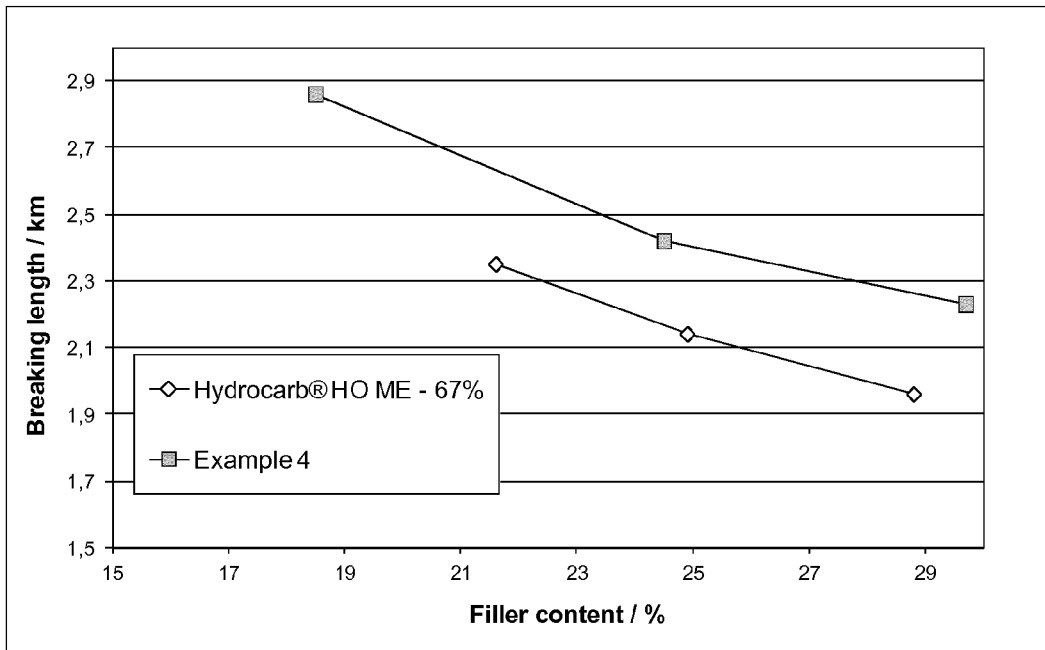
FIG. 3 shows the breaking length of wood free, uncoated paper containing Hydrocarb® HO ME-67% and the pigment particles of Example 4 as fillers in different amounts.
Figure 4:
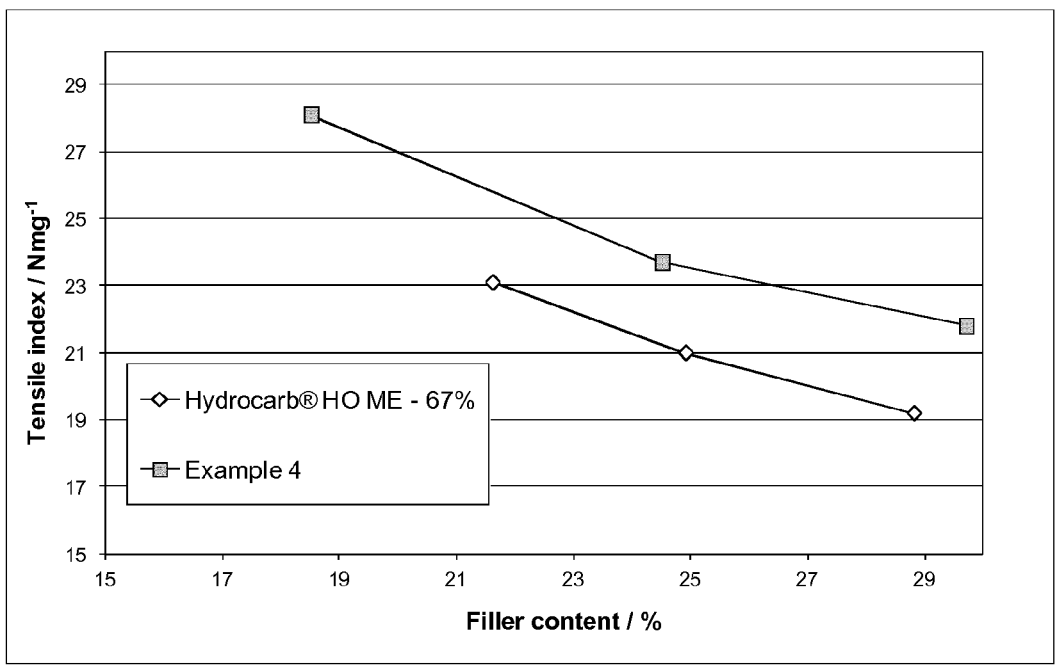
FIG. 4 shows the tensile index of wood free, uncoated paper containing Hydrocarb® HO ME-67% and the pigment particles of Example 4 as fillers in different amounts.
Figure 5:
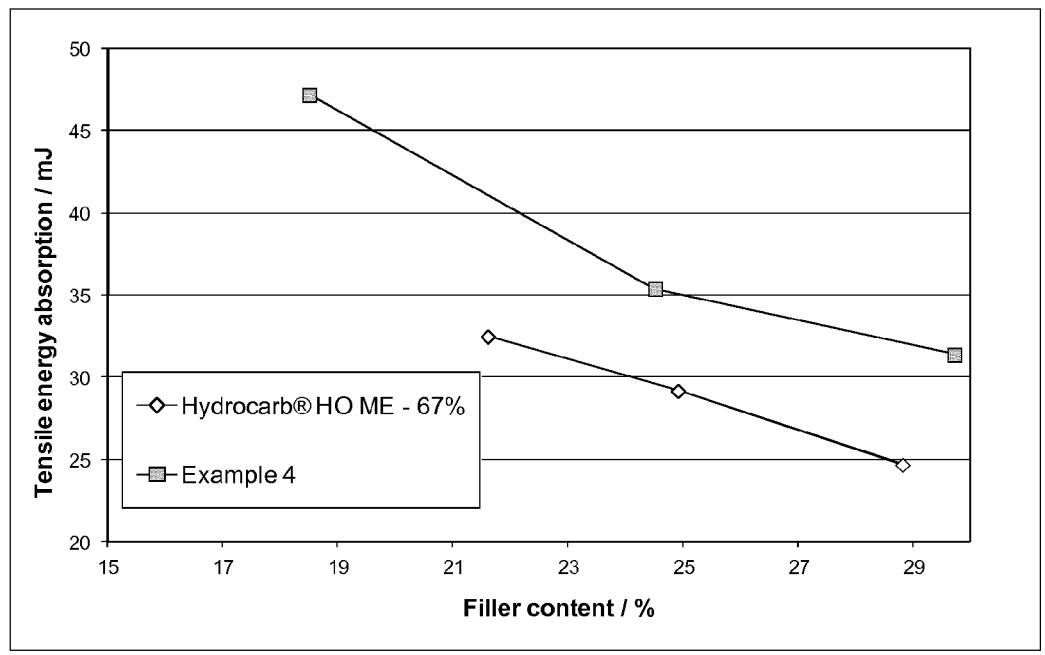
FIG. 5 shows the tensile energy absorption of wood free, uncoated paper containing Hydrocarb® HO ME-67% and the pigment particles of Example 4 as fillers in different amounts.
Figure 6:
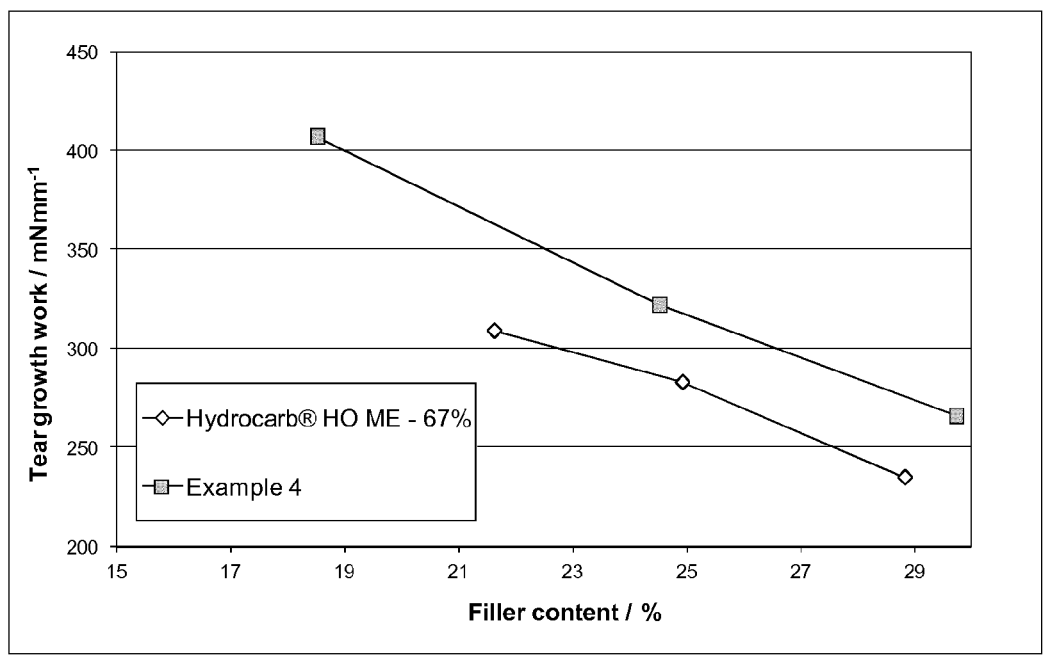
FIG. 6 shows the tear growth work of wood free, uncoated paper containing Hydrocarb® HO ME-67% and the pigment particles of Example 4 as fillers in different amounts.
Figure 7:
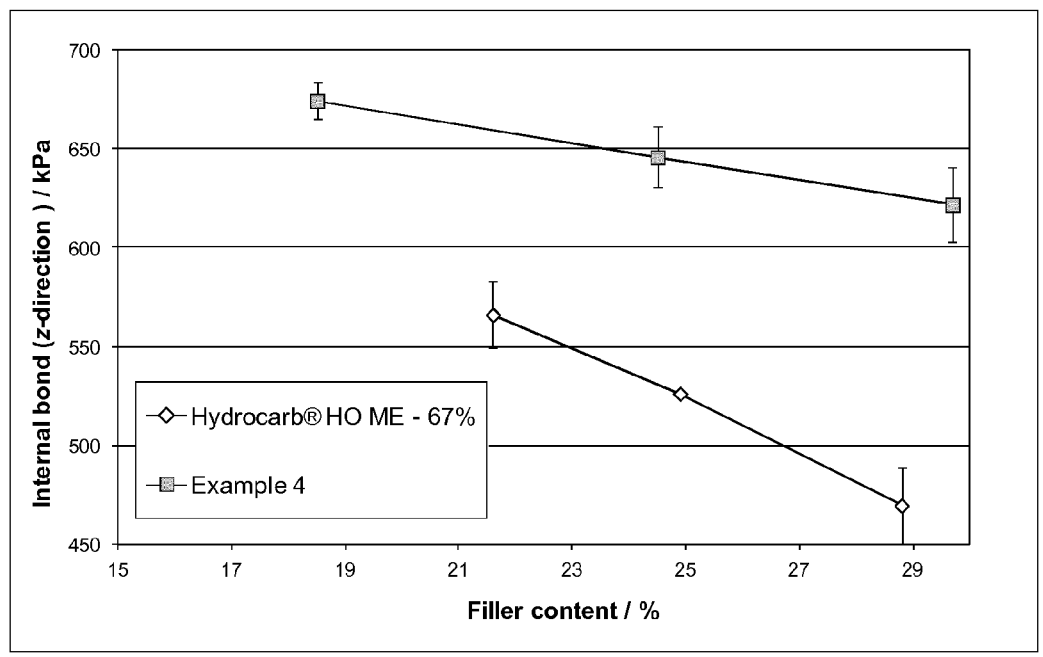
FIG. 7 shows the internal bond (z-direction) of wood free, uncoated paper containing Hydrocarb® HO ME-67% and the pigment particles of Example 4 as fillers in different amounts.
Figure 8:
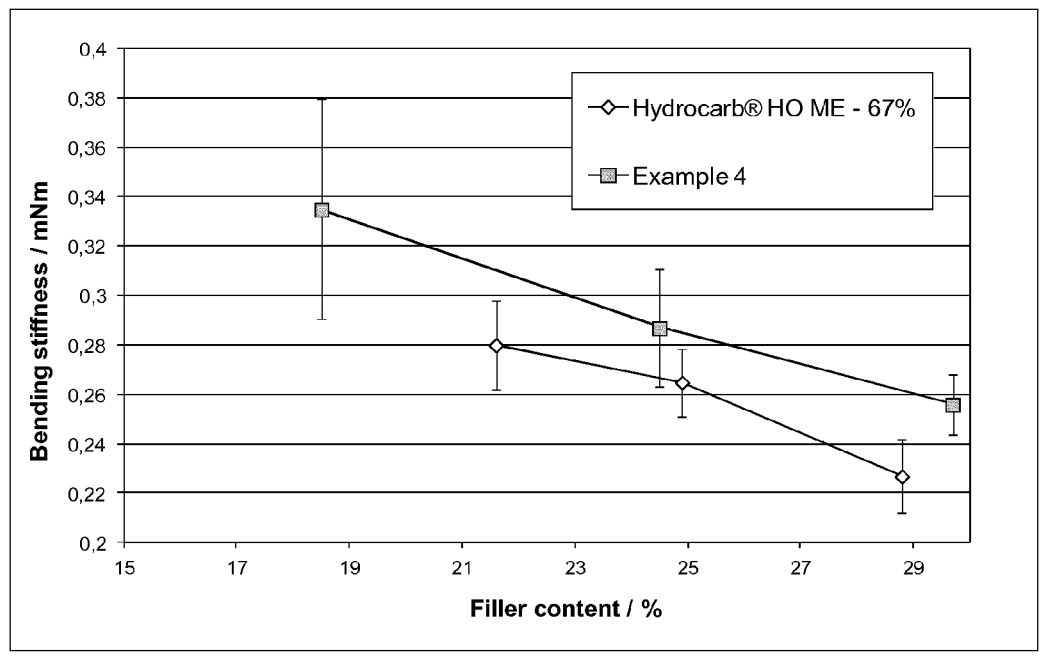
FIG. 8 shows the bending stiffness of wood free, uncoated paper containing Hydrocarb® HO ME-67% and the pigment particles of Example 4 as fillers in different amounts.
Figure 9:
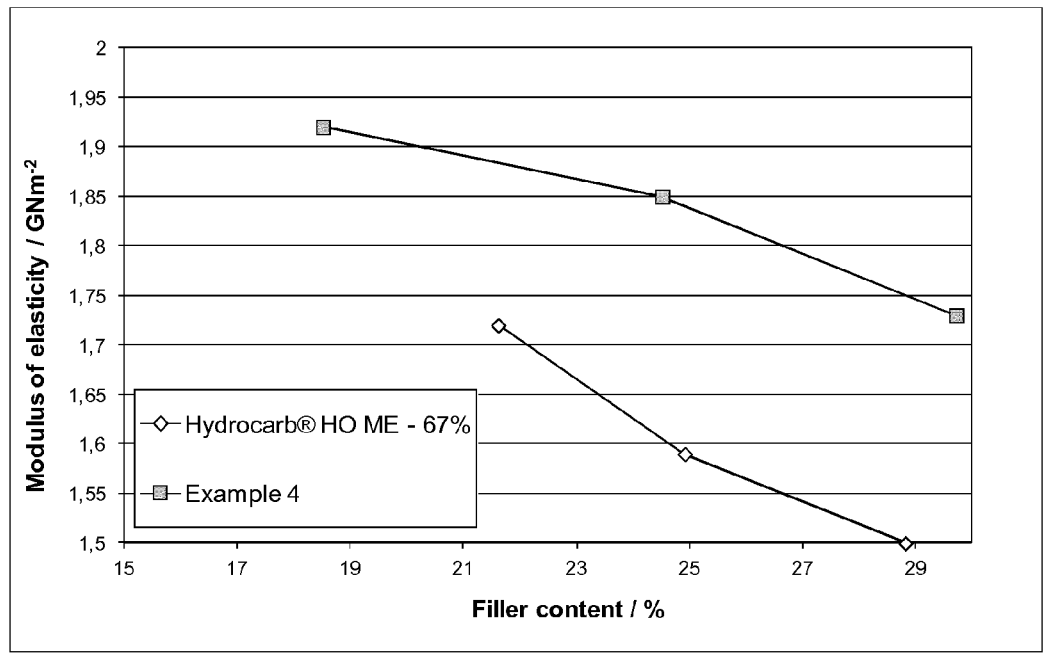
FIG. 9 shows the modulus of elasticity of wood free, uncoated paper containing Hydrocarb® HO ME-67% and the pigment particles of Example 4 as fillers in different amounts.

The results of the retention studies are shown in FIGS. 1 and 2, wherein FIG. 1 shows the results for pulp that was diluted in tap water and FIG. 2 shows the results for pulp that was diluted in clear filtrate. The retention values obtained for the inventive self-binding pigment particles of Example 3 and 11 are very good and significantly better than those of the comparative filler of Example 1.

4. Example 14

Testing of Mechanical Strength Properties of Wood Free, Uncoated Paper Containing the Inventive Pigment Particles as Filler Eucalyptus pulp (Jarilyptus) refined to 30° SR was used as pulp. The self-binding pigment particles of Example 4 were tested as paper fillers. In addition, Hydrocarb® HO ME-67% was tested as comparative example. The pigment particle suspension were diluted with water to a concentration of 10 wt.-%, based on the total amount of the suspension, and deagglomerated with a high speed stirrer (Kinematica, Switzerland).

60 g (dry) pulp were diluted in 10 dm³ tap water, and then the pigment particle suspension to be tested was added in an amount so as to obtain the desired overall filler content based on the final paper weight. The obtained suspension was stirred for 30 min. Subsequently 0.06% (based on dry weight) of a polyacrylamide (Polymin 1530, commercially available from BASF, Germany) was added as a retention aid and sheets of 78 g/m² were formed using the Rapid-Kö then hand sheet former. Each sheet was dried using the Rapid-Kö then drier.

The filler content in the handsheets was determined by burning a quarter of a dry handsheet in a muffle furnace heated to 570° C. After the burning was completed, the residue was transferred in a desiccator and allowed to cool down. When room temperature was reached, the weight of the residue was measured and the mass was related to the initially measured weight of the dry quarter hand sheet. The filler content in the examples was between 18 and 30%.

The mechanical strength properties of the handsheets were characterized after drying of the handsheets by
the breaking length according to ISO 1924-2,
the tensile index according to ISO 1924-2,
the tensile energy absorption according to ISO 1924-2,
the tear growth work according to ISO 53115,
the internal bond (z-direction) according to SCAN-P80:98/TAPPI T541,
the bending stiffness according to ISO 53123-1, and
the modulus of elasticity according to ISO 53123-1.

FIGS. 3 to 9 show the mechanical properties of the tested handsheets. The data show that the use of the self-binding pigment particles of the present invention allows to increase the filler load from about 22% to about 28%, i.e. by about 6%, without affecting the mechanical strength of the paper. In case of the internal bond (FIG. 7), the effect is even more pronounced and an even higher filler content would be possible. A special highlight is the positive effect of the inventive self-binding pigment particles on the bending stiffness (FIG. 8) and the modulus of elasticity (FIG. 9) of the paper. In particular, a good bending stiffness is an important property in wood-free uncoated paper grades such as copy paper.

5. Example 15

Testing of Mechanical Strength Properties of Supercalendered (SC) Paper Containing the Inventive Pigment Particles as Filler Thermo mechanical pulp (TMP) 85% and Pine Kraft pulp (15%) refined to 27° SR (Schopper-Riegler) were used for the handsheet study. The blend of the thermo mechanical pulp and the pine kraft pulp had 80° SR. The self-binding pigment particles of Example 3 were tested as paper fillers. In addition, the particles of Example 1, Hydrocarb® HO ME-67%, and Hydrocarb® HO ME-67%, wherein 0.8 wt.-% cationic starch (Cargill C*Bond, no. HR05947, commercially available from Cargill Deutschland GmbH, Germany) were added to the fiber suspension, based on the total weight of the dry fibers, were tested as comparative examples. The pigment particle suspensions were diluted with water to a concentration of 10 wt.-%, based on the total amount of the suspension, and deagglomerated with a high speed stirrer (Kinematica, Switzerland).

60 g (dry) pulp blend were diluted in 10 dm³ tap water. In one comparative example, 0.8 wt.-% cationic starch (Cargill C*Bond, no. HR05947, commercially available from Cargill Deutschland GmbH, Germany), based on the total weight of dry fibers, were added to the fiber suspension and the suspension was stirred for 15 min. Then the pigment particle suspension was added in an amount so as to obtain the desired overall filler content based on the final paper weight. The suspension was stirred for 30 minutes, and subsequently the retention aid Percol PBR 30 special powder (commercially available from BASF, Germany) was added in the amounts given in Table 4 below, and sheets of 52 g/m² were formed using the Rapid-Kö then hand sheet former. Each sheet was dried using the Rapid-Kö then drier. The sheets were calendared with a Voith calendar to 0.95-1.05 PPS roughness.

TABLE 4

Amount of added retention aid

| Filler | Amount of added retention aid at a filler content 37% [wt.-%, based on dry weight] | Amount of added retention aid at a filler content 42% [wt.-%, based on dry weight] |
| --- | --- | --- |
| Example 1 | 0.13% | 0.29% |
| Example 3 | 0.036% | 0.073% |

The filler content in the handsheets was determined by burning a quarter of the calendared handsheet in a muffle furnace heated to 570° C. After the burning was completed, the residue was transferred in a desiccator and allowed to cool down. When room temperature was reached, the weight of the residue was measured and the mass was related to the initially measured weight of the dry quarter hand sheet. The filler content in the examples was 37 or 42%.

Figure 10:
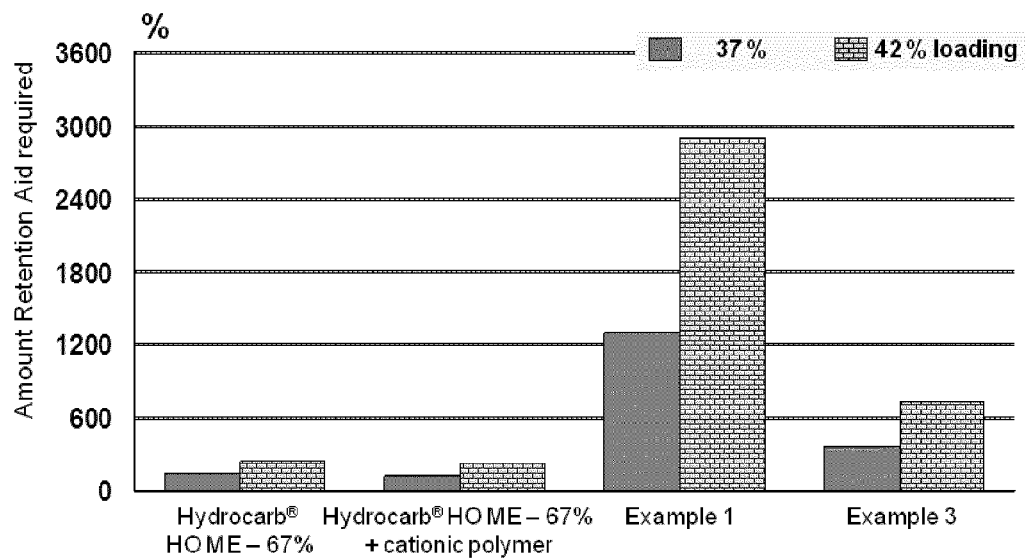
FIG. 10 shows the amount of retention aid required for paper suspensions containing Hydrocarb® HO ME-67%, Hydrocarb® HO ME-67% and a cationic polymer, the pigment particles of Example 1, the pigment particles of Example 3 as fillers.
Figure 11:
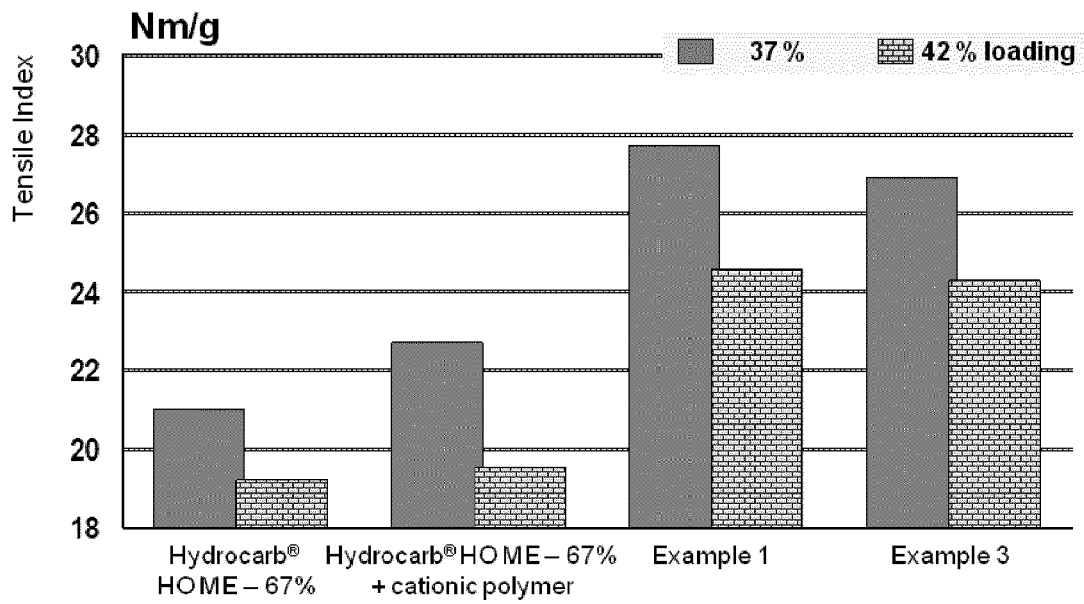
FIG. 11 shows the tensile index of supercalendered paper containing Hydrocarb® HO ME-67%, Hydrocarb® HO ME-67% and a cationic polymer, the pigment particles of Example 1, the pigment particles of Example 3 as fillers.
Figure 12:
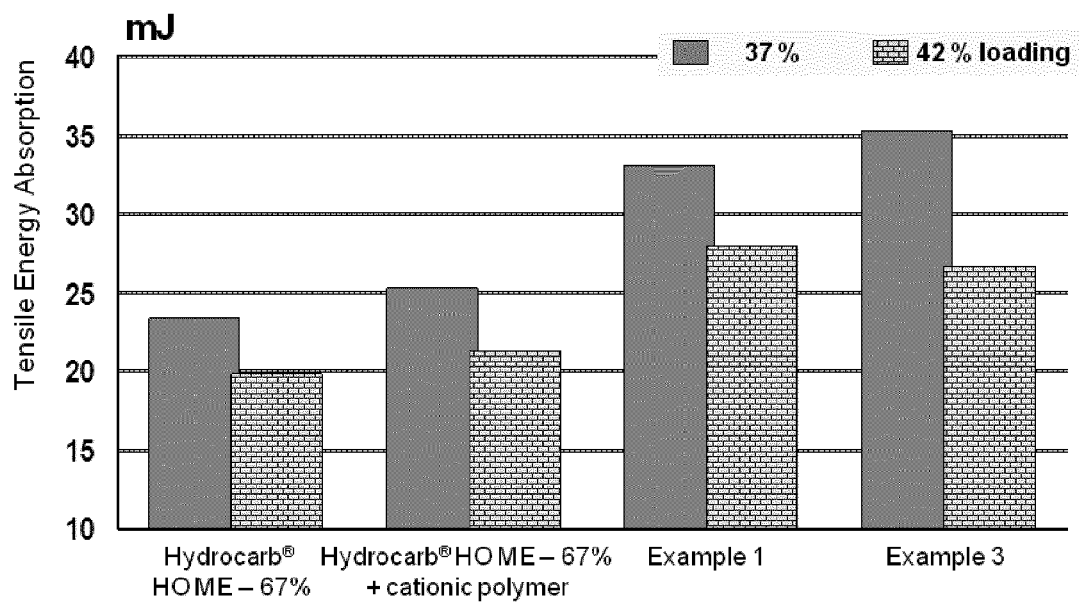
FIG. 12 shows the tensile energy absorption of supercalendered paper containing Hydrocarb® HO ME-67%, Hydrocarb® HO ME-67% and a cationic polymer, the pigment particles of Example 1, the pigment particles of Example 3 as fillers.
Figure 13:
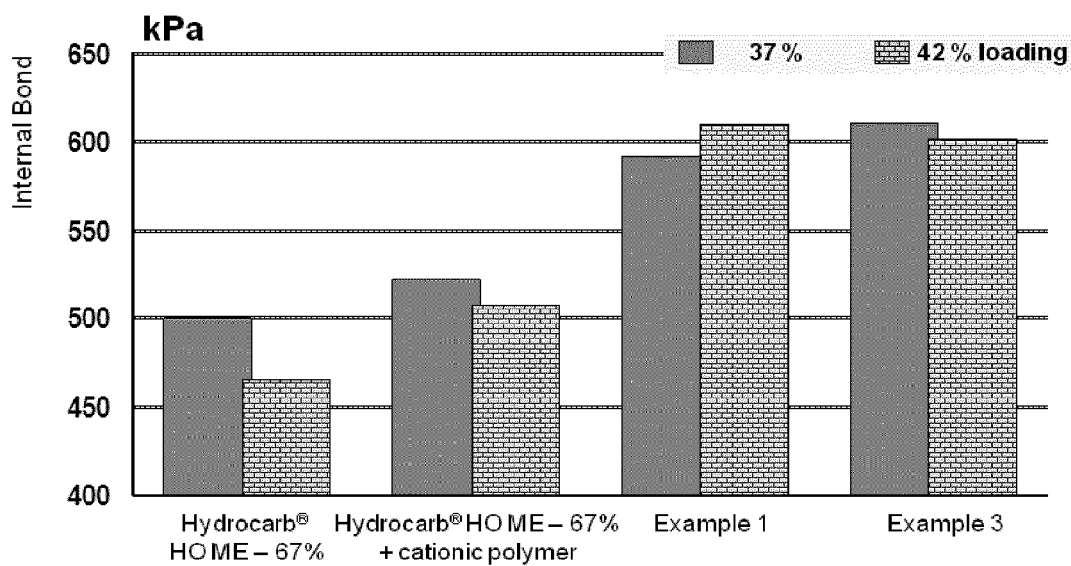
FIG. 13 shows the internal bond of supercalendered paper containing Hydrocarb® HO ME-67%, Hydrocarb® HO ME-67% and a cationic polymer, the pigment particles of Example 1, the pigment particles of Example 3 as fillers.

The reduced anionic charge of the inventive self-binding pigment particles reduced the retention polymer demand in the handsheet making (see FIG. 10). The mechanical properties of the tested handsheets are shown in FIGS. 11 to 13. All handsheets with the inventive self-binding pigment particles showed increased sheet tensile and improved internal bond compared to Hydrocarb® HO ME-67%, and Hydrocarb®HO ME-67% with addition of 0.8 wt.-% cationic starch, based on the total weight of dry fibers. In particular, the use of the pigment particles of Example 3 as filler lead to an increase in tensile index and internal bond of about 20% compared to the filler Hydrocarb® HO ME-67% (see FIGS. 11 and 13).

6. Examples 16 to 21

A chemical free calcium carbonate from Norway, Molde, having a fineness corresponding to a $d_{50}$ value of 0.8 µm and a $d_{98}$ value of 5.0 µm was employed as ground calcium carbonate (GCC). The specific surface (BET) of the ground calcium carbonate was 7.5 m²/g and the charge density was −24.8 µEq/g. The GCC was provided in the form of a filter cake having a solids content of 70.0 wt.-%.

Different types of carboxymethylcellulose (CMC) having different molecular weights were employed as anionic polymeric binder (Finnfix 2 (lowest molecular weight), Finnfix 5, Finnfix 10, Finnfix 30, Finnfix 150, and Finnfix 300 (highest molecular weight), commercially available from CP Kelko, U.S.A.). The intrinsic viscosity of the CMC was from 90 to 300 ml/g, and the degree of substitution (degree of carboxylation) was 0.7. The CMC was used in form of an aqueous solution containing 3-6 wt.-% CMC, based on the total amount of the solution.

As cationic polymer PolyDADMAC (Catiofast BP® liquid, commercially available from BASF, Germany) was employed in form of a solution containing 50 wt.-% PolyDADMAC, based on the total weight of the solution.

In a first step, a slurry with a solid content of 50.0 wt.-%, based on the total amount of the slurry, was prepared from the GCC filter cake by adding water and 2.0 wt.-% of the different types of CMC, based on the total amount of the dry GCC, namely Finnfix 2 (Example 16), Finnfix 5 (Example 17), Finnfix 10 (Example 18), Finnfix 30 (Example 19), Finnfix 150 (Example 20), and Finnfix 300 (Example 21)

(see also Table 5 below). In a second step, polyDADMAC was added in an amount of 0.8 wt.-%, based on the total amount of the dry GCC.

Subsequently, the obtained slurry was wet ground at room temperature. The wet grinding of slurry was done in a vertical attritor mill (Dynomill®, Bachofen, Switzerland) having a volume of 600 cm$^3$ at a speed of 2500 rpm and at a flow rate of 500 cm$^3$/min. 480 cm$^3$ (80%) of the grinding chamber was filled with grinding beads having a diameter of 0.6-1.0 mm (melt fused beads consisting of 68% baddeleyit and 32% amorphous silicate). If necessary the solid content was adjusted during grinding to avoid blocking of the mill. The grinding was carried out until more than 73 to 77% of the particles had a particle size of less than 1 μm as determined by Sedigraph 5120.

TABLE 5

Amounts and types of anionic polymeric binder and cationic polymers used in Examples 16 to 21.

| Example | CMC type | CMC (wt.-%) | PolyDADMAC (wt.-%) |
|---|---|---|---|
| 16 | Finnfix 2 | 2.0 | 0.8 |
| 17 | Finnfix 5 | 2.0 | 0.8 |
| 18 | Finnfix 10 | 2.0 | 0.8 |
| 19 | Finnfix 30 | 2.0 | 0.8 |
| 20 | Finnfix 150 | 2.0 | 0.8 |
| 21 | Finnfix 300 | 2.0 | 0.8 |

Results

The products obtained were analyzed with respect to particle size, specific surface (BET), brightness, electrochemical charge (PET), and LOI. Tables 6 and 7 summarize the properties of the obtained slurries and the pigment particles contained therein.

TABLE 6

Particle size distribution of the obtained self-binding pigment particles of Examples 16 to 21.

| | Particle size (Mastersizer 2000) | | $d_{50}$ value | $d_{98}$ value |
|---|---|---|---|---|
| Example | <2 μm (wt.-%) | <1 μm (wt.-%) | (μm) | (μm) |
| 16 | 59 | 8 | 1.8 | 4 |
| 17 | 50 | 7 | 2.0 | 5 |
| 18 | 70 | 17 | 1.6 | 4 |
| 19 | 68 | 22 | 1.6 | 5 |
| 20 | 75 | 30 | 1.4 | 4 |
| 21 | 70 | 28 | 1.4 | 6 |

TABLE 7

Particle size distribution of the obtained self-binding pigment particles of Examples 16 to 21.

| | Examples | | | | | |
|---|---|---|---|---|---|---|
| | 16 | 17 | 18 | 19 | 20 | 21 |
| Specific surface area (BET) (m$^2$/g) | 8.3 | 6.7 | 5.7 | 5.8 | 5.4 | 5.5 |
| Charge density (PET) (μEq/g) | −74 | −71 | −78 | −75 | −74 | −78 |
| LOI slurry (%) | 3.7 | 3.7 | 3.1 | 3.1 | 3.1 | 3.3 |
| LOI cake (%) | 3.0 | 2.8 | 2.5 | 2.6 | 2.4 | 2.5 |
| Free polymer in solution (%) | 23 | 29 | 24 | 20 | 23 | 30 |

From the measured details, it can be gathered that the charge density of the self-binding pigment particles is between −70 and −80 μEq/g and only slightly varies depending on the molecular weight of the employed CMC. The free polymer in the solution was found to be below 30% for every one of Examples 16 to 21.

7. Examples 22 to 26

A chemical free calcium carbonate from Norway, Molde, having a fineness corresponding to a $d_{50}$ value of 0.8 μm and a $d_{98}$ value of 5.0 μm was employed as ground calcium carbonate (GCC). The specific surface (BET) of the ground calcium carbonate was 7.5 m$^2$/g and the charge density was −24.8 μEq/g. The GCC was provided in the form of a filter cake having a solids content of 70.0 wt.-%.

The anionic polymeric binder was a carboxymethylcellulose (CMC) having an intrinsic viscosity of the CMC was 135 ml/g, and the degree of substitution (degree of carboxylation) was 0.7. The CMC was used in form of an aqueous solution containing 6 wt.-% CMC, based on the total amount of the solution.

As cationic polymer PolyDADMAC (Catiofast BP® liquid, commercially available from BASF, Germany) was employed in form of a solution containing 50 wt.-% PolyDADMAC, based on the total weight of the solution.

In a first step, a slurry with a solid content of 50.0 wt.-%, based on the total amount of the slurry, was prepared from the GCC filter cake by adding water and 2.0 wt.-% of CMC, based on the total amount of the dry GCC. In a second step, polyDADMAC was added in different amounts, namely, in amounts of 0.4 wt.-% (Example 23), 0.6 wt.-% (Example 24), 1.0 wt.-% (Example 25), and 1.2 wt.-% (Example 26), based on the total amount of the dry GCC. In Example 21, no polyDADMAC was added.

Subsequently, the obtained slurry was wet ground at room temperature. The wet grinding of slurry was done in a vertical attritor mill (Dynomill®, Bachofen, Switzerland) having a volume of 600 cm$^3$ at a speed of 2500 rpm and at a flow rate of 500 cm$^3$/min. 480 cm$^3$ (80%) of the grinding chamber was filled with grinding beads having a diameter of 0.6-1.0 mm (melt fused beads consisting of 68% baddeleyit and 32% amorphous silicate). If necessary the solid content was adjusted during grinding to avoid blocking of the mill. The grinding was carried out until more than 73 to 77% of the particles had a particle size of less than 1 μm as determined by Sedigraph 5120.

TABLE 8

Amounts and types of anionic polymeric binder and cationic polymers used in Examples 22 to 26.

| Example | CMC (wt.-%) | PolyDADMAC (wt.-%) |
|---|---|---|
| 22 | 2.0 | 0.0 |
| 23 | 2.0 | 0.4 |
| 24 | 2.0 | 0.6 |
| 25 | 2.0 | 1.0 |
| 26 | 2.0 | 1.2 |

Results

The products obtained were analyzed with respect to particle size, specific surface (BET), brightness, electrochemical charge (PET), and LOI. Tables 9 and 10 summarize the properties of the obtained slurries and the pigment particles contained therein.

TABLE 9

Particle size distribution of the obtained self-
binding pigment particles of Examples 22 to 26.

| Example | Particle size (Mastersizer 2000) | | $d_{50}$ value (µm) | $d_{98}$ value (µm) |
|---|---|---|---|---|
| | <2 µm (wt.-%) | <1 µm (wt.-%) | | |
| 22 | 88 | 45 | 1.1 | 4 |
| 23 | 78 | 34 | 1.3 | 5 |
| 24 | 73 | 29 | 1.4 | 5 |
| 25 | 39 | 3 | 2.3 | 6 |
| 26 | 22 | 6 | 3.3 | 6 |

TABLE 10

Particle size distribution of the obtained self-
binding pigment particles of Examples 22 to 26.

| | Examples | | | | |
|---|---|---|---|---|---|
| | 22 | 23 | 24 | 25 | 26 |
| Specific surface area (BET) (m²/g) | 9.0 | 6.3 | 6.3 | 6.5 | 7.8 |
| Charge density (PET) (µEq/g) | −102 | −88 | −79 | −60 | −54 |
| LOI slurry (%) | 2.8 | 3.2 | 3.5 | 3.6 | 3.8 |
| LOI cake (%) | 0.9 | 1.5 | 2.1 | 3.0 | 3.3 |
| Free polymer in solution (%) | 86 | 65 | 48 | 19 | 16 |

Figure 14:
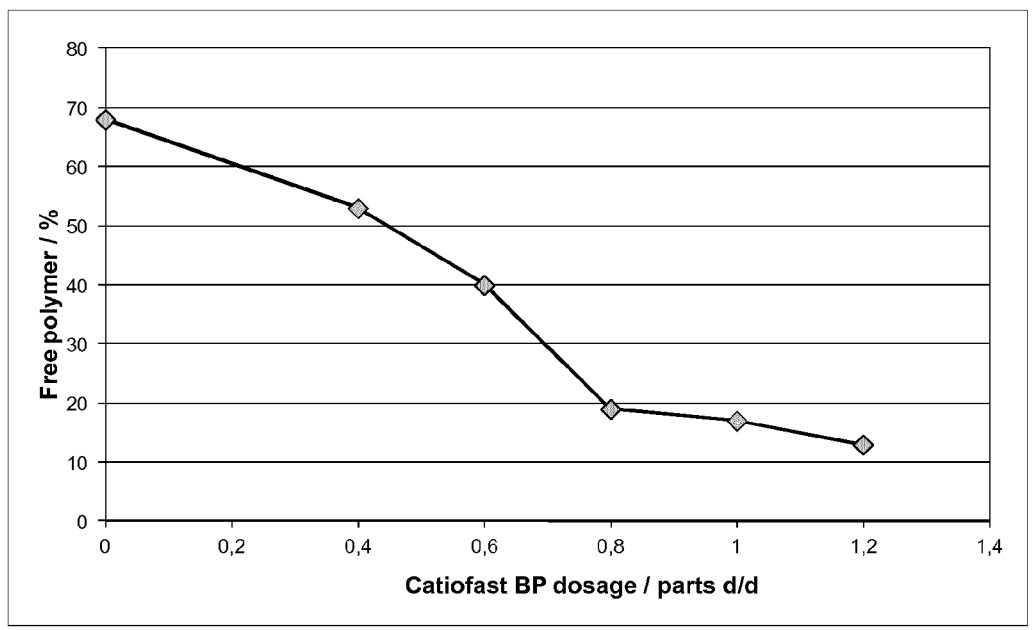
FIG. 14 shows the amount of free polymer in aqueous suspensions of self-binding calcium carbonate particles versus the amount of the added cationic polymer.

From the measured details, it can be gathered that the charge density of the self-binding pigment particles is linearly reduced with increasing amount of cationic polymer. As is shown in FIG. 14 the amount of free polymer in the solution is also reduced with increasing amount of cationic polymer and reaches a plateau of around 15 to 20% free polymer at an amount of cationic polymer of more than 0.6 wt.-%, based on the amount of dry GCC.

8. Example 27

Retention Studies

The self-binding pigment particles of Examples 16 to 26 were tested as paper fillers in a dynamic retention study. In addition, Hydrocarb® HO ME-67% was tested as comparative examples The fibers used for the retention study comprised 85% thermo mechanical pulp (TMP) and 15% pine kraft pulp. The pulp was either diluted in tap water which was treated with 0.057 g/l of a sodium polyacrylic acid homopolymer having a molecular weight of 3500 g/mol and a polydispersity D=2.5, or with clear filtrate, i.e. the water that was used in the paper mill for the dilution of the pulp. 5.5 g/l fibers were mixed with 5.5 g/l filler to obtain a pulp consistency of the pulp/filler mix of 11.0 g/l as in the headbox of the paper machine. The filler was added within 1 min stirring time by 10 s stirring at 800 rpm, 10 s stirring at 1200 rpm, 5 s stirring at 1000 rpm, and 5 s stirring at 800 rpm, wherein after 20 s Percol PBR 30 special powder (commercially available from BASF, Germany) in form of 0.2% solution was added as retention aid. After additional 30 s, the valve was opened. The tests were carried out with no retention aid and different concentrations of retention aid, namely, with 250 g/t, 500 g/t, 750 g/t, 1000 g/t, and 1500 g/t.

The relative retention was determined by measuring the turbidity NTU of the clear filtrate and the sample filtrates over time:

$$\text{Relative retention } [\%] = \frac{T_0 - T_t}{T_0} \cdot 100\%$$

wherein $T_0$ is the turbidity of the clear filtrate and $T_t$ is the turbidity of the sample filtrate at the moment t.

Figure 15:
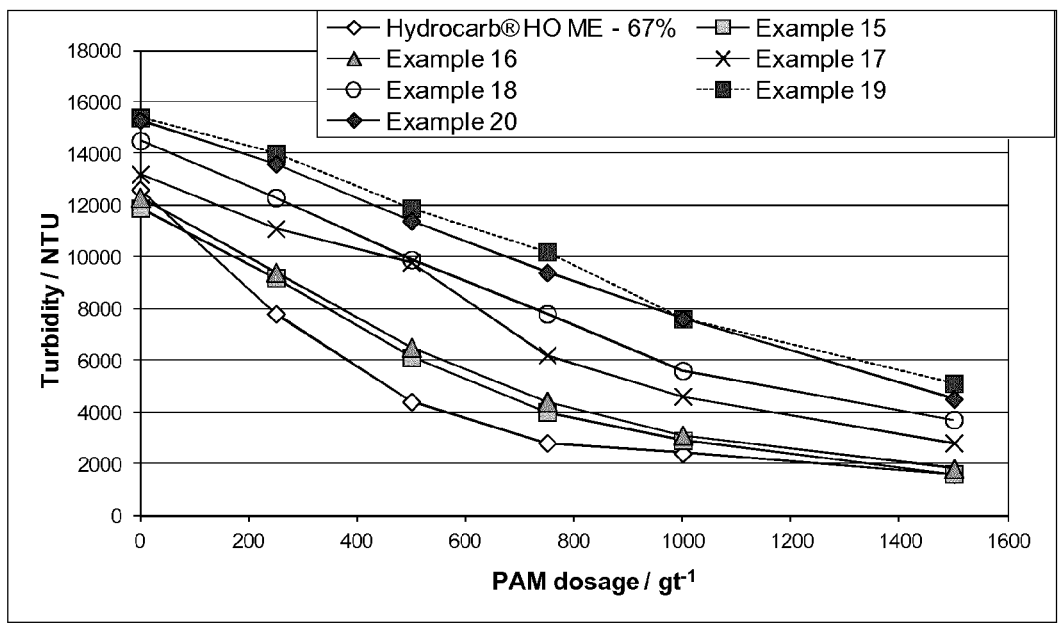
FIG. 15 shows the turbidity values obtained for paper suspensions containing Hydrocarb® HO ME-67% or the pigment particles of Examples 15 to 20 as fillers.
Figure 16:
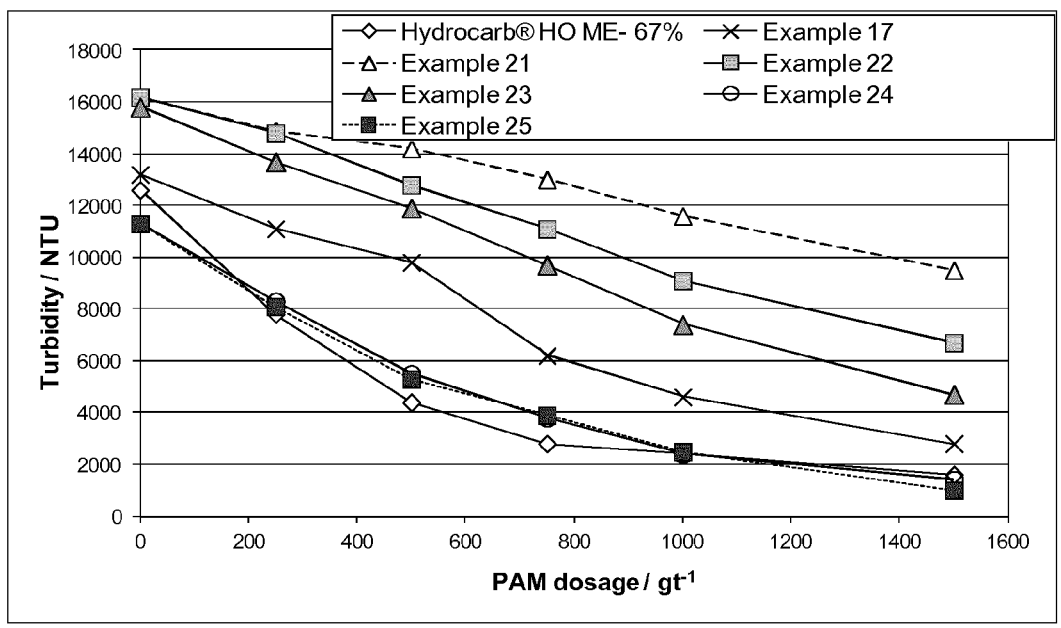
FIG. 16 shows the turbidity values obtained for paper suspensions containing Hydrocarb® HO ME-67% or the pigment particles of Examples 21 to 25 as fillers.
Figure 17:
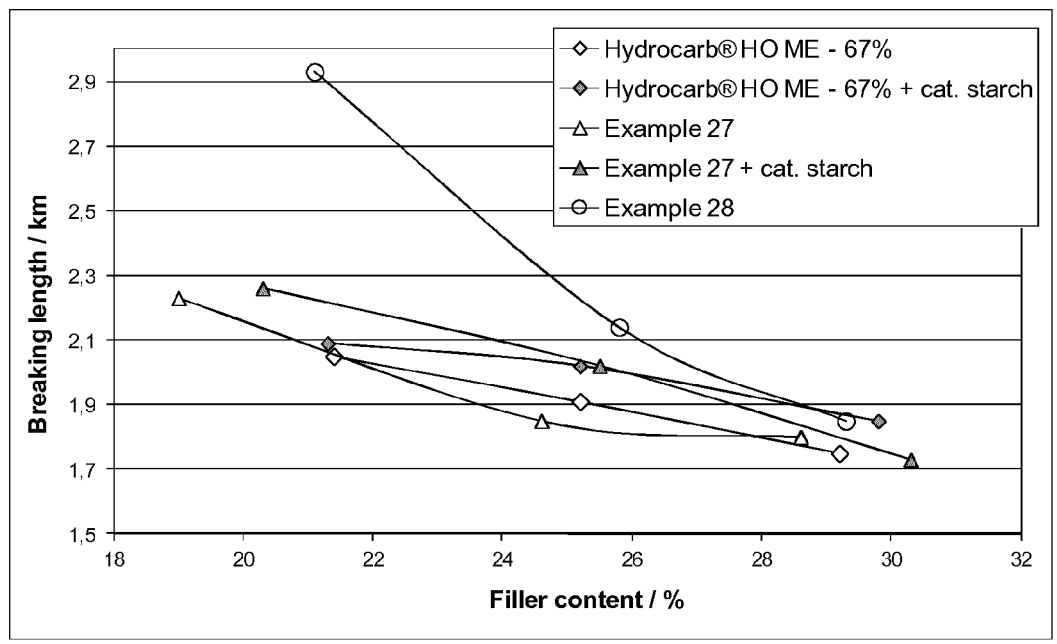
FIG. 17 shows the breaking length of wood free, uncoated paper containing Hydrocarb® HO ME-67% with and without cationic polymer, the pigment particles of Example 27 with and without cationic polymer, and the pigment particles of Example 28 as fillers in different amounts.
Figure 18:
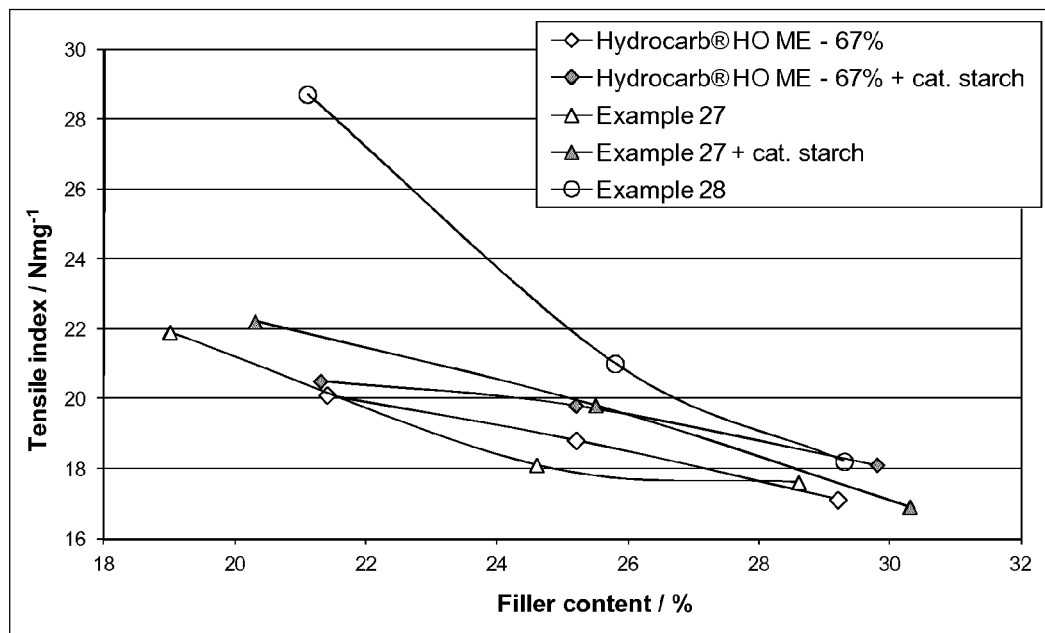
FIG. 18 shows the tensile index of wood free, uncoated paper containing Hydrocarb® HO ME-67% with and without cationic polymer, the pigment particles of Example 27 with and without cationic polymer, and the pigment particles of Example 28 as fillers in different amounts.
Figure 19:
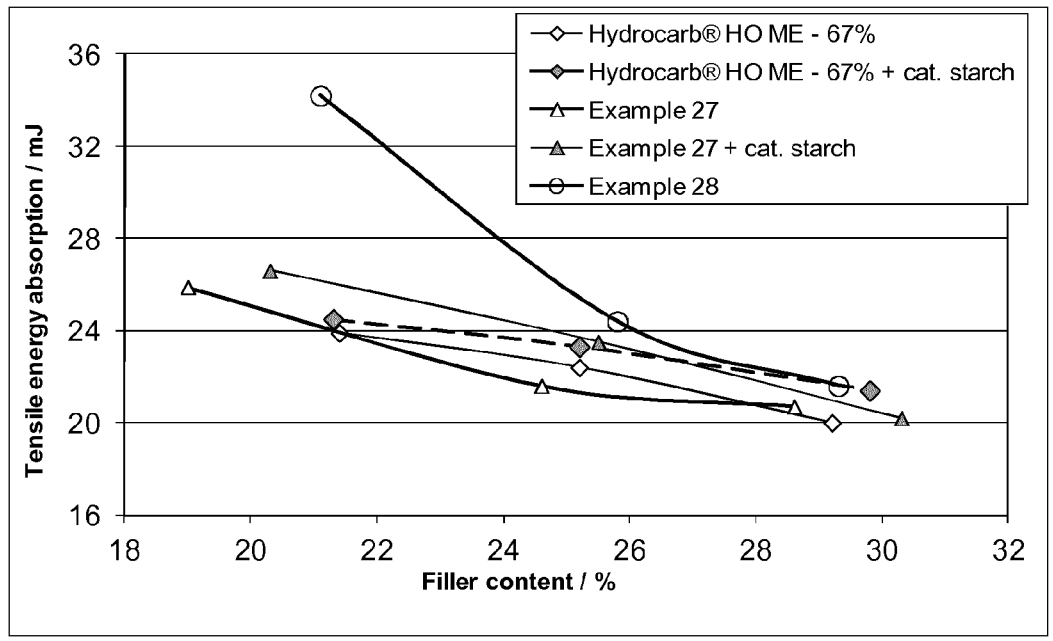
FIG. 19 shows the tensile energy absorption of wood free, uncoated paper containing Hydrocarb® HO ME-67% with and without cationic polymer, the pigment particles of Example 27 with and without cationic polymer, and the pigment particles of Example 28 as fillers in different amounts.
Figure 20:
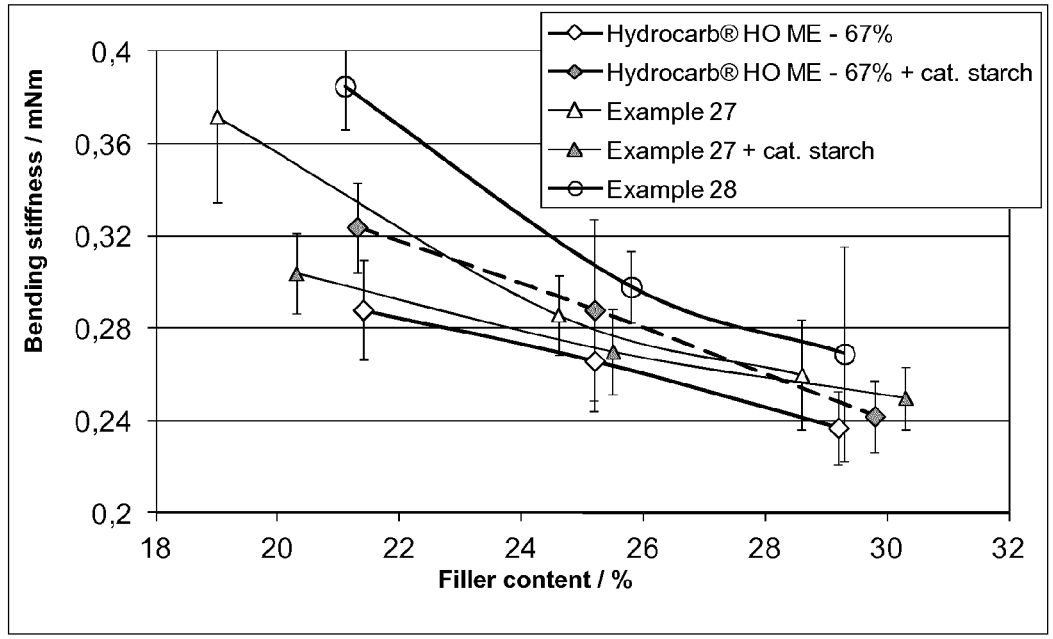
FIG. 20 shows the bending stiffness of wood free, uncoated paper containing Hydrocarb® HO ME-67% with and without cationic polymer, the pigment particles of Example 27 with and without cationic polymer, and the pigment particles of Example 28 as fillers in different amounts.
Figure 21:
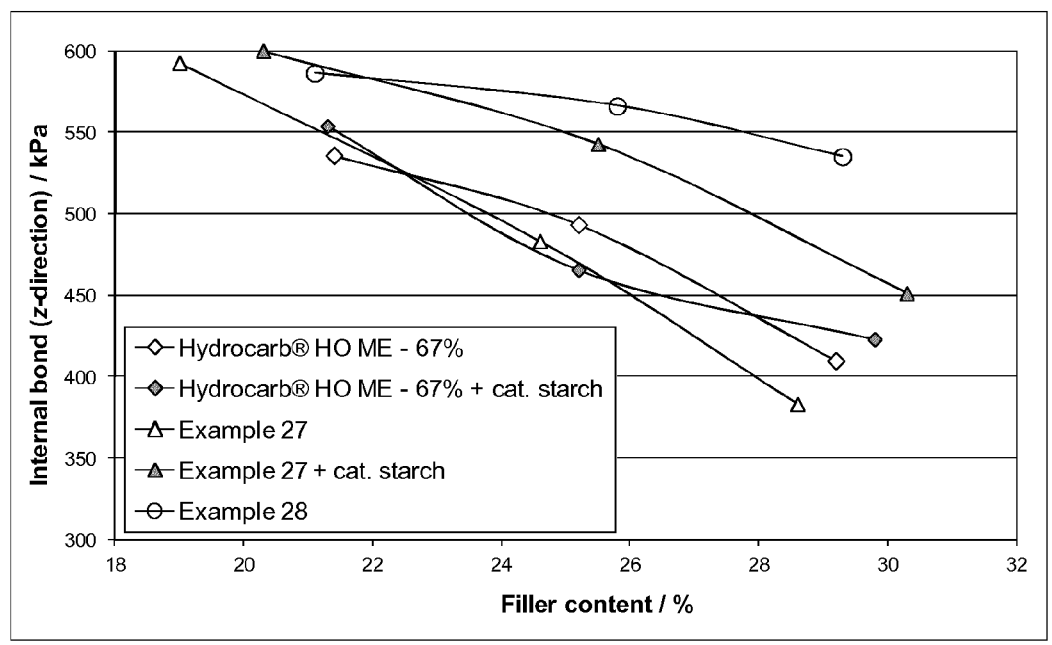
FIG. 21 shows the internal bond (z-direction) of wood free, uncoated paper containing Hydrocarb® HO ME-67% with and without cationic polymer, the pigment particles of Example 27 with and without cationic polymer, and the pigment particles of Example 28 as fillers in different amounts.

The results of the retention studies are shown in FIGS. 15 and 16. The retention values obtained for the self-binding pigment particles of Example 15 to 25 were in the most cased below those of the comparative filler Hydrocarb® HO ME-67% but were still acceptable. It can be gathered from FIG. 15 that the retention values of the self-binding particles of Examples 16 to 21 differ depending on the molecular weight of the CMC; the lower the molecular weight of the CMC, the better the retention.

FIG. 16 shows that the retention value of the self-binding particles of Examples 22 to 26 are increased with increasing amount of cationic polymer.

9. Examples 28 and 29

Example 28

GCC with CMC (Comparative Example)

A chemical free calcium carbonate from Norway, Molde, having a fineness corresponding to a $d_{50}$ value of 0.8 µm and a $d_{98}$ value of 5.0 µm was employed as ground calcium carbonate (GCC). The specific surface (BET) of the ground calcium carbonate was 7.5 m²/g and the charge density was −24.8 µEq/g. The GCC was provided in the form of a filter cake having a solids content of 83.0 wt.-%.

The anionic polymeric binder was a carboxymethylcellulose (CMC) having an intrinsic viscosity of the CMC was 135 ml/g, and the degree of substitution (degree of carboxylation) was 0.7. The CMC was used in form of an aqueous solution containing 6 wt.-% CMC, based on the total amount of the solution.

A premixed solution of CMC was prepared by dissolving 31 g CMC in 1.4 kg water under vigorous stirring. After 30 min of stirring, the premixed CMC solution was added to 4.8 kg of the Hydrocarb® HO-ME filter cake. The mixture was dispersed with a dissolver stirrer at 2000-4000 rpm.

Subsequently, the obtained slurry was wet ground at room temperature. The wet grinding of slurry was done in a vertical attritor mill (Dynomill®, Bachofen, Switzerland) having a volume of 600 cm³ at a speed of 2500 rpm and at a flow rate of 500 cm³/min. 480 cm³ (80%) of the grinding chamber was filled with grinding beads having a diameter of 0.6-1.0 mm (melt fused beads consisting of 68% baddeleyit and 32% amorphous silicate). The grinding was carried out until more than 60% of the particles had a particle size of less than 1 µm as determined by Sedigraph 5120.

Example 29

GCC with CMC and Cationic Starch (Inventive Example)

As cationic polymer, a cationic starch (Cargill C*Bond, no. HR05947, commercially available from Cargill Deutschland GmbH, Germany) was employed in form of a dry powder.

A premixed solution of cationic starch was prepared by dissolving 16 g of the cationic starch in 2.25 kg water and heating the obtained suspension up to 95° C. for one hour.

Subsequently, the cationic starch solution was mixed with the particles obtained in Example 28.

The obtained slurry was deagglomerated by passing the slurry three times through a homogenizer (Megatron, Kinematica, Switzerland) at room temperature.

10. Example 30

Testing of Mechanical Strength Properties of Wood Free, Uncoated Paper Containing the Inventive Pigment Particles as Filler Eucalyptus pulp (Jarilyptus) refined to 30° SR was used as pulp. The slurry of the self-binding pigment particles obtained in inventive Example 29 was tested as paper filler. In addition, a slurry of Hydrocarb® HO ME-67% having a solid content of 67 wt.-%, based on the total amount of the slurry, was tested as comparative example, as well as the slurry of the particles obtained in comparative Example 28. Furthermore, slurries of Hydrocarb® HO ME-67% and Example 28 with cationic starch were prepared, wherein the amount of starch was 1.5 wt.-%, based on the total amount of dry GCC.

60 g (dry) pulp were diluted in 10 dm$^3$ tap water, and then the pigment particle suspension to be tested was added in an amount so as to obtain the desired overall filler content based on the final paper weight. The obtained suspension was stirred for 30 min. Subsequently 0.06% (based on dry weight) of a polyacrylamide (Polymin 1530, commercially available from BASF, Germany) was added as a retention aid and sheets of 78 g/m$^2$ were formed using the Rapid-Kö then hand sheet former. Each sheet was dried using the Rapid-Kö then drier.

The filler content in the handsheets was determined by burning a quarter of a dry handsheet in a muffle furnace heated to 570° C. After the burning was completed, the residue was transferred in a desiccator and allowed to cool down. When room temperature was reached, the weight of the residue was measured and the mass was related to the initially measured weight of the dry quarter hand sheet. The filler content in the examples was between 18 and 31%.

The mechanical strength properties of the handsheets were characterized after drying of the handsheets by
the breaking length according to ISO 1924-2,
the tensile index according to ISO 1924-2,
the tensile energy absorption according to ISO 1924-2,
the tear growth work according to ISO 53115,
the internal bond (z-direction) according to SCAN-P80:98/TAPPI T541,
the bending stiffness according to ISO 53123-1, and
the modulus of elasticity according to ISO 53123-1.

FIGS. 17 to 21 show the mechanical properties of the tested handsheets. The handsheets without cationic starch, i.e. the handsheets containing Hydrocarb® HO ME-67% or the particles of Example 28 as filler, show the lowest mechanical strength properties. The addition of cationic starch to the paper suspension can improve the mechanical strength slightly. However, the use of the inventive self-binding particles as filler hugely improves the mechanical strength properties of the tested handsheets at filler levels around 20%. The data also show that the use of the self-binding pigment particles of the present invention allows to increase the filler load from about 22% to about 27 to 28%, i.e. by about 5 to 6%, without affecting the mechanical strength of the paper. A special highlight is the positive effect of the inventive self-binding pigment particles on the bending stiffness (FIG. 20) of the paper. In particular, a good bending stiffness is an important property in wood-free uncoated paper grades such as copy paper.

The invention claimed is:

1. A process for preparing self-binding pigment particles comprising the following steps:
    a) providing a suspension comprising at least one calcium carbonate containing material,
    b) providing an anionic polymeric binder that comprises at least one modified polysaccharide,
    c) providing at least one cationic polymer selected from the group consisting of one or more polyamines, polyethyleneimines, polyacrylamides, cationic epichlorohydrin resins, polydiallyldimethylammonium chlorides, cationic starches, cationic guars, and any mixture thereof,
    d) mixing the suspension of step a) and the binder of step b), and
    e) grinding the mixed suspension of step d) so that the particle size of the calcium carbonate material is reduced and self-binding pigment particles are obtained, wherein the at least one cationic polymer of step c):
        i) is mixed in step d) with the suspension of step a) and the binder of step b), and/or
        ii) is mixed with the suspension obtained after grinding step e), and the obtained mixture is deagglomerated,
    wherein the binder of step b) is added in an amount from 0.001 to 20 wt.-% based on the total weight of the dry calcium carbonate containing material, and
    wherein the at least one cationic polymer of step c) is added in an amount from 0.001 to 20 wt.-% based on the total weight of the dry calcium carbonate containing material, and
    wherein the grinding step e) is carried out until the fraction of self-binding pigment particles having a particle size of less than 2 μm is greater than 20 wt.-% based on the total weight of the pigment particles, as measured with a Mastersizer 2000.

2. The process of claim 1, wherein in step d) the suspension of step a) is, in a first step, mixed with the binder of step b), and then, in a second step, is mixed with the at least one cationic polymer of step c).

3. The process of claim 2, wherein in the first step the suspension of step a) is mixed with a first part the binder of step b), the obtained mixture is ground and then mixed with the remaining part of the binder of step b).

4. The process of claim 1, wherein in step d) the binder of step b) is, in a first step, mixed with the cationic polymer of step c), and then, in a second step, is mixed with the suspension of step a).

5. The process of claim 1, wherein in step d) the suspension of step a) is mixed with the binder of step b) and the cationic polymer of step c) in one step.

6. The process of claim 1, wherein the cationic polymer is added in an amount such that the charge density of the obtained self-binding pigment particles is lower compared to self-binding pigment particles not containing the cationic polymer.

7. The process of claim 1, wherein the cationic polymer is added in an amount such that the charge density of the obtained self-binding pigment particle is between −100 and −5 μEq/g.

8. The process of claim 1, wherein the cationic polymer is added in an amount such that the charge density of the obtained self-binding pigment particle is between −80 and −10 μEq/g.

9. The process of claim 1, wherein the cationic polymer is added in an amount such that the charge density of the obtained self-binding pigment particle is between −70 and −15 µEq/g.

10. The process of claim 1, wherein the at least one calcium carbonate containing material is selected from the group consisting of calcium carbonate, calcium carbonate containing minerals, mixed calcium carbonate based fillers, and any mixture thereof.

11. The process of claim 1, wherein the at least one calcium carbonate containing material is ground calcium carbonate.

12. The process of claim 1, wherein the at least one calcium carbonate containing material of step a) is provided in form of particles having a weight median particle diameter $d_{50}$ value from 0.1 to 100 µm.

13. The process of claim 1, wherein the at least one calcium carbonate containing material of step a) is provided in form of particles having a weight median particle diameter $d_{50}$ value from 0.5 to 50 µm.

14. The process of claim 1, wherein the at least one calcium carbonate containing material of step a) is provided in form of particles having a weight median particle diameter $d_{50}$ value from 5.0 to 25 µm.

15. The process of claim 1, wherein the at least one calcium carbonate containing material is provided in form of particles have a specific surface area of from 0.1 to 200 $m^2/g$.

16. The process of claim 1, wherein the at least one calcium carbonate containing material is provided in form of particles have a specific surface area of from 1 to 25 $m^2/g$.

17. The process of claim 1, wherein the at least one calcium carbonate containing material is provided in form of particles have a specific surface area of from 2 to 15 $m^2/g$.

18. The process of claim 1, wherein the suspension of step a) has a solid content of at least 1 wt.-% based on the total weight of the suspension.

19. The process of claim 1, wherein the suspension of step a) has a solid content of from 1 to 90 wt.-% based on the total weight of the suspension.

20. The process of claim 1, wherein the suspension of step a) has a solid content of from 20 to 75 wt.-% based on the total weight of the suspension.

21. The process of claim 1, wherein the suspension of step a) has a solid content of from 45 to 65 wt.-% based on the total weight of the suspension.

22. The process of claim 1, wherein the at least one modified polysaccharide is a carboxymethyl derivate, a carboxymethyl hydroxypropyl derivate, and/or a carboxymethyl hydroxyethyl derivate of a polysaccharide.

23. The process of claim 1, wherein the at least one modified polysaccharide is selected from the group consisting of one or more carboxymethylcelluloses, anionic starches, anionic guars, and any mixture thereof.

24. The process of claim 1, wherein the at least one modified polysaccharide has a degree of substitution of hydroxyl groups from 0.4 to 2.0.

25. The process of claim 1, wherein the at least one modified polysaccharide has a degree of substitution of hydroxyl groups from 0.5 to 1.8.

26. The process of claim 1, wherein the at least one modified polysaccharide has a degree of substitution of hydroxyl groups from 0.6 to 1.6.

27. The process of claim 1, wherein the at least one modified polysaccharide has a degree of substitution of hydroxyl groups from 0.7 to 1.5.

28. The process of claim 1, wherein the binder of step b) is a carboxymethylcellulose having an intrinsic viscosity from 5 to 500 ml/g.

29. The process of claim 1, wherein the binder of step b) is a carboxymethylcellulose having an intrinsic viscosity from 10 to 400 ml/g.

30. The process of claim 1, wherein the binder of step b) is a carboxymethylcellulose having an intrinsic viscosity from 20 to 350 ml/g.

31. The process of claim 1, wherein the binder of step b) is in form of a solution or dry material.

32. The process of claim 1, wherein the binder of step b) is in form of a solution having a binder concentration from 1 to 70 wt.-% based on the total weight of the solution.

33. The process of claim 1, wherein the binder of step b) is in form of a solution having a binder concentration from 2 to 30 wt.-% based on the total weight of the solution.

34. The process of claim 1, wherein the binder of step b) is in form of a solution having a binder concentration from 3 to 15 wt.-% based on the total weight of the solution.

35. The process of claim 1, wherein the binder of step b) is in form of a solution having a binder concentration from 4 to 10 wt.-% based on the total weight of the solution.

36. The process of claim 1, wherein the binder of step b) is added in an amount from 0.005 to 15 wt.-% based on the total weight of the dry calcium carbonate containing material.

37. The process of claim 1, wherein the binder of step b) is added in an amount from 0.01 to 10 wt.-% based on the total weight of the dry calcium carbonate containing material.

38. The process of claim 1, wherein the binder of step b) is added in an amount from 0.05 to 5 wt.-% based on the total weight of the dry calcium carbonate containing material.

39. The process of claim 1, wherein the at least one cationic polymer of step c) is in form of a solution or dry material.

40. The process of claim 1, wherein the at least one cationic polymer of step c) is in form of an aqueous solution having a concentration from 1 to 70 wt.-% based on the total weight of the solution.

41. The process of claim 1, wherein the at least one cationic polymer of step c) is in form of an aqueous solution having a concentration from 2 to 55 wt.-% based on the total weight of the solution.

42. The process of claim 1, wherein the at least one cationic polymer of step c) is in form of an aqueous solution having a concentration from 5 to 50 wt.-% based on the total weight of the solution.

43. The process of claim 1, wherein the at least one cationic polymer of step c) is in form of an aqueous solution having a concentration from 30 to 50 wt.-% based on the total weight of the solution.

44. The process of claim 1, wherein the at least one cationic polymer of step c) is added in an amount from 0.005 to 15 wt.-% based on the total weight of the dry calcium carbonate containing material.

45. The process of claim 1, wherein the at least one cationic polymer of step c) is added in an amount from 0.01 to 10 wt.-% based on the total weight of the dry calcium carbonate containing material.

46. The process of claim 1, wherein the at least one cationic polymer of step c) is added in an amount from 0.05 to 5 wt.-% based on the total weight of the dry calcium carbonate containing material.

47. The process of claim 1, wherein the at least one cationic polymer of step c) is added in an amount from 0.5 to 2.5 wt.-% based on the total weight of the dry calcium carbonate containing material.

48. The process of claim 1, wherein the grinding step e) is carried out at a temperature from 5 to 110° C.

49. The process of claim 1, wherein the grinding step e) is carried out at a temperature from 10 to 100° C.

50. The process of claim 1, wherein the grinding step e) is carried out at a temperature from 15 to 80° C.

51. The process of claim 1, wherein the grinding step e) is carried out at a temperature from 20 to 25° C.

52. The process of claim 1, wherein the grinding step e) is carried out in batch or continuously.

53. The process of claim 1, wherein the process further comprises a step of concentrating the obtained suspension of self-binding pigment particles.

54. A self-binding pigment particle suspension obtained by the process of claim 1.

55. A paper, plastic, paint, coating, concrete or agriculture product comprising the self-binding pigment particle suspension of claim 54.

56. The paper, plastic, paint, coating, concrete or agriculture product of claim 55, wherein the self-binding pigment particle suspension is used in wet end processes of a paper machine, in a cigarette paper, board and/or coating application, or as a support for rotogravure and/or offset and/or ink jet printing and/or continuous ink jet printing and/or flexography and/or electrography and/or decoration surfaces, or the self-binding pigment particle suspension is used to reduce sun light and UV exposure of plant leaves.

57. The process of claim 1, wherein the grinding step e) is carried out until the fraction of self-binding pigment particles having a particle size of less than 2 μm is greater than 40 wt.-% based on the total weight of the pigment particles, as measured with a Mastersizer 2000.

* * * * *